United States Patent
Gan et al.

(10) Patent No.: US 12,495,456 B2
(45) Date of Patent: Dec. 9, 2025

(54) SIGNALING INFORMATION EXCHANGE METHOD AND COMMUNICATION APPARATUS IN WIRELESS LOCAL AREA NETWORK

(71) Applicant: HUAWEI TECHNOLOGIES CO., LTD., Shenzhen (CN)

(72) Inventors: Ming Gan, Shenzhen (CN); Dandan Liang, Shenzhen (CN); Jian Yu, Shenzhen (CN); Yunbo Li, Shenzhen (CN); Yuchen Guo, Shenzhen (CN); Xun Yang, Shenzhen (CN); Yiqing Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 392 days.

(21) Appl. No.: 17/991,920

(22) Filed: Nov. 22, 2022

(65) Prior Publication Data

US 2023/0102644 A1    Mar. 30, 2023

Related U.S. Application Data

(63) Continuation of application No. PCT/CN2021/091229, filed on Apr. 29, 2021.

(30) Foreign Application Priority Data

May 25, 2020    (CN) .......................... 202010451572.7

(51) Int. Cl.
*H04W 76/15*    (2018.01)
*H04W 48/08*    (2009.01)
(Continued)

(52) U.S. Cl.
CPC ........... *H04W 76/15* (2018.02); *H04W 48/08* (2013.01); *H04W 84/12* (2013.01); *H04W 88/08* (2013.01)

(58) Field of Classification Search
None
See application file for complete search history.

(56) References Cited

U.S. PATENT DOCUMENTS 11,228,963 B2 *   1/2022  Patil ...................... H04W 76/15
12,133,162 B2 *  10/2024  Kim ....................... H04W 48/20
(Continued)

FOREIGN PATENT DOCUMENTS

CN    101867521 A    10/2010
CN    105828394 A    8/2016
(Continued)

OTHER PUBLICATIONS

Japanese Notice of Allowance issued in corresponding Japanese Application No. 2022-572368, dated Jul. 16, 2024, pp. 1-3.
(Continued)

*Primary Examiner* — Hong S Cho
(74) *Attorney, Agent, or Firm* — HAUPTMAN HAM, LLP

(57) ABSTRACT

A signaling information exchange method in a wireless local area network (WLAN), includes generating, by an access point (AP), a management frame, and sending, by the access point, the management frame. The AP is part of a first AP multi-link device (MLD). The management frame includes MLD information. The MLD information includes a first MLD element. The first MLD element includes a sub-element of the first MLD element that includes information of another AP in the first AP MLD.

20 Claims, 21 Drawing Sheets

(51) Int. Cl.
  *H04W 84/12* (2009.01)
  *H04W 88/08* (2009.01)

(56) References Cited

U.S. PATENT DOCUMENTS

| | | | |
|---|---|---|---|
| 2019/0150214 A1 | 5/2019 | Zhou et al. | |
| 2019/0280749 A1* | 9/2019 | Wee | H04W 16/28 |
| 2019/0335454 A1 | 10/2019 | Huang et al. | |
| 2020/0221545 A1* | 7/2020 | Stacey | H04W 84/12 |
| 2021/0314846 A1* | 10/2021 | Chu | H04W 40/244 |
| 2021/0337613 A1* | 10/2021 | Seok | H04W 76/15 |

FOREIGN PATENT DOCUMENTS

| | | |
|---|---|---|
| CN | 113453380 A | 9/2021 |
| WO | 2020098145 A1 | 5/2020 |

OTHER PUBLICATIONS

IEEE Std 802.11-2016, IEEE Standard for Information technology—Telecommunications and information exchange between systems Local and metropolitan area networks—Specific requirements, Part 11: Wireless LAN Medium Access Control (MAC) and Physical Layer (PHY) Specifications, Approved Dec. 7, 2016, total 3534 pages.

IEEE P802.11ax/D6.0, Nov. 2019, Draft Standard for Information technology—Tele-communications and information exchange between systems Local and metropolitan area networks—Specific requirements, Part 11: Wireless LAN Medium Access Control (MAC) and Physical Layer (PHY) Specifications, 780 pages.

International Search Report issued in corresponding International Application No. PCT/CN2021/091229, dated Jul. 21, 2021, pp. 1-11.

Chinese Office Action issued in corresponding Chinese Application No. 202010451572.7, dated Jul. 5, 2022, pp. 1-19.

IEEE IEEE 802.11-19/1509r5:"Discussion on Multi-link Setup", Sep. 16, 2019, total 13 pages.

IEEE IEEE 802.11-20/0030r2:"Multi-link Association Follow Up", Jan. 10, 2020, total 10 pages.

Notice of Preliminary Rejection issued in KR1020227044963 dated Jul. 23, 2025.

Liwen Chu et al, "EHT BSS with Wider BW", IEEE 802.11-20/0396r0,Mar. 2020,total 12 pages.

Japanese Notice of Allowance issued in corresponding Japanese Application No. 2024-135400, dated Sep. 30, 2025, pp. 1-3.

* cited by examiner

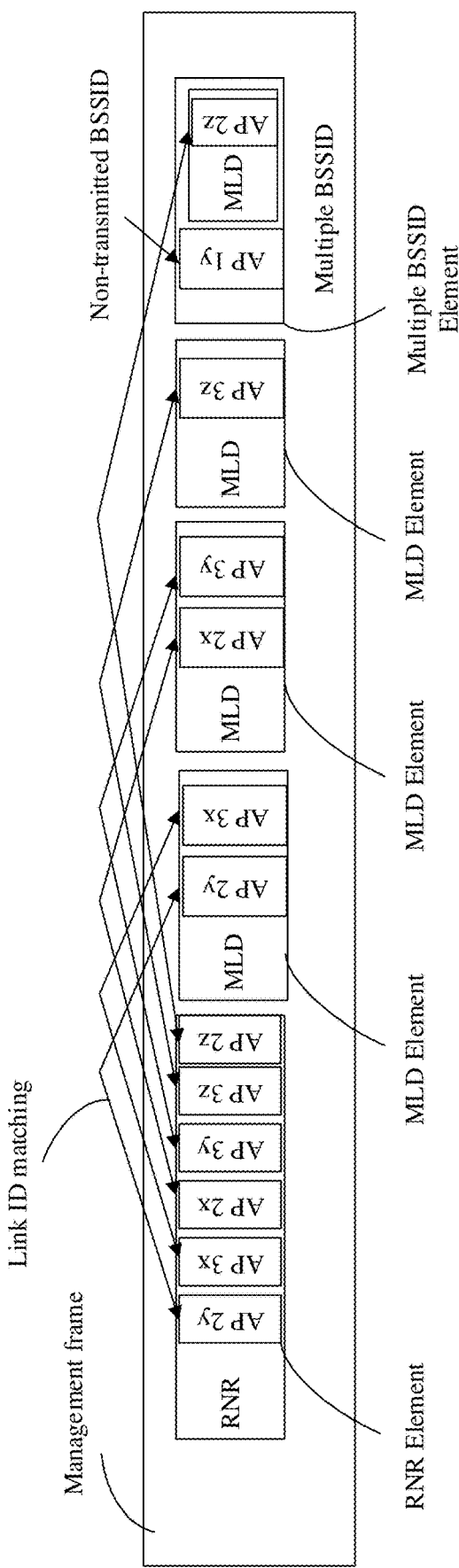
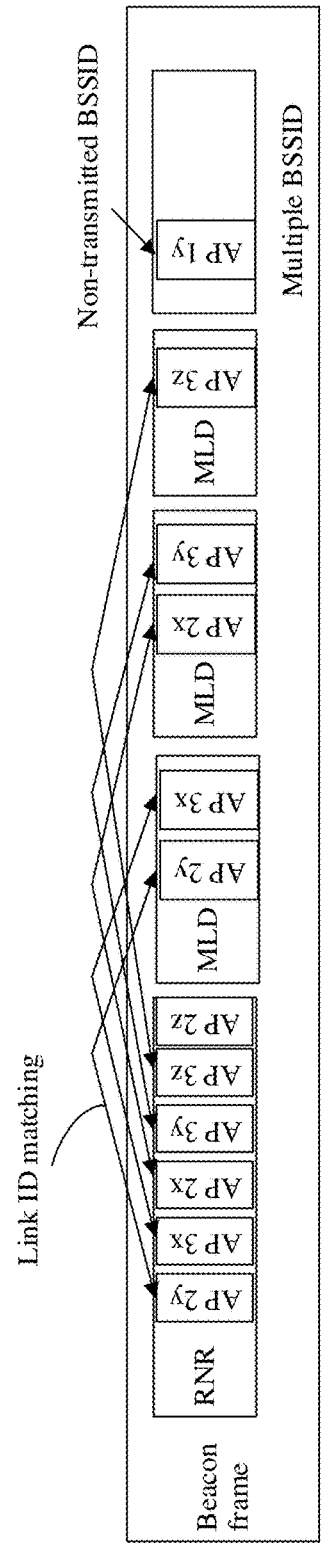
FIG. 13a
FIG. 13b

SIGNALING INFORMATION EXCHANGE METHOD AND COMMUNICATION APPARATUS IN WIRELESS LOCAL AREA NETWORK

CROSS-REFERENCE TO RELATED APPLICATION

This application is a continuation of International Application No. PCT/CN2021/091229, filed on Apr. 29, 2021, which claims priority to Chinese Patent Application No. 202010451572.7, filed on May 25, 2020. The disclosure of the aforementioned applications are hereby incorporated by reference in their entireties.

TECHNICAL FIELD

This application relates to the field of communication technologies, and in particular, to a signaling information exchange method and a communication apparatus in a wireless local area network.

BACKGROUND

To greatly improve a service transmission rate of a WLAN system, the Institute of Electrical and Electronics Engineers (IEEE) 802.11ax standard further uses an orthogonal frequency division multiple access (OFDMA) technology based on an existing orthogonal frequency division multiplexing (OFDM) technology. The OFDMA technology supports a plurality of nodes to simultaneously send and receive data to achieve multi-station diversity gains. During formulation of 802.11ax in 2017, the Federal Communications Commission (FCC) of the United States released a new free frequency band 5925-7125 MHz, which is referred to as 6 GHZ below. Therefore, 802.11ax standard workers extend an operating range of 802.11ax-compliant devices from 2.4 GHz and 5 GHz to 2.4 GHZ, 5 GHZ, and 6 GHz in the 802.11ax project authorization requests (PAR).

IEEE 802.11 next-generation Wi-Fi protocol (EHT) devices need to be forward compatible. Therefore, these devices also support operating spectrums of the 802.11ax-compliant devices, to be specific, support 2.4 GHZ, 5 GHZ, and 6 GHz frequency bands. Channel division is performed based on the newly opened free 6 GHz frequency band, and a bandwidth that can be supported may exceed a maximum bandwidth 160 MHz supported in 5 GHz, for example, 320 MHz. In IEEE 802.11ax next-generation Wi-Fi extremely high throughput protocol, a peak throughput may also be increased by using more streams, for example, increasing a quantity of streams to 16, through cooperation with a plurality of frequency bands (2.4 GHz, 5 GHZ, and 6 GHz), or in another manner, in addition to using an ultra-high bandwidth. On a same frequency band, a peak throughput may be further increased through cooperation of a plurality of channels or in another manner. This reduces a service transmission delay. In the following, a plurality of frequency bands or a plurality of channels are collectively referred to as a plurality of links. Although a plurality of links are configured in the 802.11ax and the earlier Wi-Fi standards that have a same operating frequency band with the 802.11ax, a different basic service set (BSS) is usually established for each of the plurality of links. Communication with a station in a BSS to which the link belongs can be performed on only one link at the same time.

Main functions of 802.11ax and an earlier multiple basic service set identifier (BSSID) technology are to virtualize one physical AP into a plurality of logical APs, that is, to form a plurality of virtual networks. Each virtual network is used to manage a different station. Similar to AP products in a current Wi-Fi scenario, an AP can be virtualized into a reporting AP and a guest AP.

How to apply the multiple BSSID technology to a multi-link device to provide functions of a plurality of virtual networks is a technical problem that is being studied by a person skilled in the art.

SUMMARY

Embodiments of this application disclose a signaling information exchange method in a WLAN and a related apparatus.

According to a first aspect, an embodiment of this application provides a signaling information exchange method in a WLAN, including: An access point AP generates a management frame. The AP belongs to a first AP multilink device MLD. The management frame includes MLD information. The MLD information includes a first MLD element. A subelement of the first MLD element is used to carry information about another AP in the first MLD to which the AP belongs. The first MLD element includes type information indicating an MLD element type. The access point sends the management frame.

According to a second aspect, an embodiment of this application provides a signaling information exchange method in a WLAN, including: A station receives a management frame sent by an access point AP. The AP belongs to a first AP multilink device MLD. The management frame includes MLD information. The MLD information includes a first MLD element. A subelement of the first MLD element is used to carry information about another AP in the first MLD to which the AP belongs. The MLD element includes type information indicating an MLD element type. The station obtains, based on the management frame, the information about the another AP in the first MLD to which the AP belongs.

According to a third aspect, a communication apparatus in a wireless local area network WLAN is provided, including: a processing unit, configured to generate a management frame, where an AP belongs to a first AP multilink device MLD, the management frame includes MLD information, the MLD information includes a first MLD element, a subelement of the first MLD element is used to carry information about another AP in the first MLD to which the AP belongs, and the first MLD element includes type information indicating an MLD element type; and a transceiver unit, configured to receive and send the management frame.

According to a fourth aspect, a communication apparatus in a wireless local area network WLAN is provided, including: a transceiver unit, configured to receive a management frame sent by an access point AP, where the AP belongs to a first AP multilink device MLD, the management frame includes MLD information, the MLD information includes a first MLD element, a subelement of the first MLD element is used to carry information about another AP in the first MLD to which the AP belongs, and the MLD element includes type information indicating an MLD element type; and a processing unit, configured to obtain, based on the management frame, the information about the another AP in the first MLD to which the AP belongs.

According to a fifth aspect, a communication apparatus is provided, including a processor and a memory. The memory stores instructions, and when the instructions are run by the processor, the communication apparatus is enabled to: generate a management frame, where an AP belongs to a first AP multi-link device MLD, the management frame includes MLD information, the MLD information includes a first MLD element, a subelement of the first MLD element is used to carry information about another AP in the first MLD to which the AP belongs, and the first MLD element further includes type information indicating an MLD element type; and send the management frame.

According to a sixth aspect, a communication apparatus is provided, including a processor and a memory. The memory stores instructions, and when the instructions are run by the processor, the communication apparatus is enabled to: receive a management frame sent by an access point AP, where the AP belongs to a first AP multi-link device MLD, the management frame includes MLD information, the MLD information includes a first MLD element, a subelement of the first MLD element is used to carry information about another AP in the first MLD to which the AP belongs, and the MLD element includes type information indicating an MLD element type; and obtain, based on the management frame, the information about the another AP in the first MLD to which the AP belongs.

According to a flexible signaling structure provided in this application, one or more MLD elements and an MLD element included in a multiple BSSID element are used to describe information about one or more APs in a multi-AP multi-link device, to help a station select an appropriate AP or AP MLD for association. The signaling structure of the MLD information provided in this embodiment of this application is simple and flexible.

In an implementation of the method or apparatus in any one of the foregoing aspects, the MLD element further includes a common control field. The common control field includes the type information that indicates the element type of the MLD element. In this embodiment of this application, the type information indicating the MLD element type is carried in the MLD element, so that the station may determine a type of the MLD based on the information, to determine a relationship between all MLDs in the multi-AP multi-link device and a structure of the MLD.

In an implementation of the method or apparatus in any one of the foregoing aspects, the element type includes a formal MLD element and a virtual MLD element. The type information specifically includes a virtual MLD field that indicates whether the MLD element is a virtual MLD element.

In an implementation of the method or apparatus in any one of the foregoing aspects, the virtual MLD field includes 1 bit.

If the MLD element is the virtual MLD element, the virtual MLD field is set to a first value.

If the MLD element is a formal MLD element, the virtual MLD field is set to a second value.

In an implementation of the method or apparatus in any one of the foregoing aspects, the element type includes a formal MLD element, a virtual MLD element, and a special MLD element. The type information includes a virtual MLD field that indicates whether the MLD element is a virtual MLD element, and a special MLD resource that indicates whether the MLD element is a special MLD element.

In an implementation of the method or apparatus in any one of the foregoing aspects, the virtual MLD field includes 1 bit. The special MLD field includes 1 bit. If the MLD element is the virtual MLD element, the virtual MLD field is set to a first value, and the special MLD field is set to a second value. If the MLD element is the special MLD element, the virtual MLD field is set to a second value, and the special MLD field is set to a first value. If the MLD element is a formal MLD element, the virtual MLD field is set to a second value, and the special MLD field is set to the second value.

In an implementation of the method or apparatus in any one of the foregoing aspects, the MLD element further includes an MLD common information field. The common control field further includes an MLD address present field that indicates whether an MLD address field is present in the MLD common information field. The MLD address field carries an identifier of the first MLD.

In an implementation of the method or apparatus in any one of the foregoing aspects, if the type information indicates that the MLD element is the virtual MLD element, the MLD common information field includes the MLD address field. If the type information indicates that the MLD element is the formal MLD element, the MLD common information field includes the MLD address field.

In an implementation of the method or apparatus in any one of the foregoing aspects, if the type information indicates that the MLD element is the special MLD element, the MLD common information field does not include the MLD address field.

In an implementation of the method or apparatus in any one of the foregoing aspects, if the another AP in the first MLD belongs to a second multiple BSSID set, and another AP in the second multiple BSSID set belongs to a second MLD, the MLD information further includes a second MLD element. A subelement in the second MLD element carries information about an AP in the second MLD.

In an implementation of the method or apparatus in any one of the foregoing aspects, if the AP belongs to a first multiple BSSID set, the MLD information further includes a first multiple BSSID element. The first multiple BSSID element includes information about a non-transmitted AP in the first multiple BSSID set.

In an implementation of the method or apparatus in any one of the foregoing aspects, if the non-transmitted AP in the first multiple BSSID set belongs to a third MLD, the multiple BSSID element further includes a third MLD element. A subelement of the third MLD element carries information about another AP in the third MLD.

In an implementation of the method or apparatus in any one of the foregoing aspects, if the another AP in the first MLD belongs to a third multiple BSSID set, and an AP in the third multiple BSSID set does not belong to an MLD, the MLD information further includes a fourth MLD element. A subelement of the fourth MLD element carries the information about the AP.

In an implementation of the method or apparatus in any one of the foregoing aspects, the first MLD element is a formal MLD element, and the type information in the first MLD element indicates that the first MLD element is the formal MLD element.

In an implementation of the method or apparatus in any one of the foregoing aspects, the second MLD element is a virtual MLD element, and type information in the second MLD element indicates that the second MLD element is the virtual MLD element.

In an implementation of the method or apparatus in any one of the foregoing aspects, the third MLD is a formal MLD element, and type information in the second MLD element indicates that the second MLD element is the formal MLD element.

In an implementation of the method or apparatus in any one of the foregoing aspects, the fourth MLD element is a special MLD element, and type information in the fourth MLD element indicates that the fourth MLD element is the special MLD element.

The communication apparatus in the third aspect, the fourth aspect, the fifth aspect, and the sixth aspect may be a chip. The processing unit may be a processing circuit of the chip. The transceiver unit may be an input/output interface circuit. The processing circuit may be configured to process signaling or data information provided by the input/output interface circuit. The input/output interface circuit may be configured to input/output the data or signaling information for the chip.

According to a seventh aspect of embodiments of this application, a computer-readable storage medium is provided. The computer-readable storage medium stores computer program code. When the computer program code runs on a processor, the processor is enabled to perform the method in any one of the first aspect and the second aspect and the corresponding possible implementations.

According to an eighth aspect of embodiments of this application, a computer program product is provided. The program product stores a computer program (instructions) executed by the foregoing processor. When the computer program runs on the processor, the processor is enabled to perform the method in any one of the first aspect and the second aspect and the corresponding possible implementations.

According to a ninth aspect of embodiments of this application, a communication apparatus is provided. The apparatus includes a processor, and may further include a transceiver and a memory. The transceiver is configured to receive and send information, or is configured to communicate with another network element. The memory is configured to store a computer program (instructions). The processor is configured to execute the computer program, to support the communication apparatus to implement the method in any one of the first aspect and the second aspect and the corresponding possible implementations.

According to a tenth aspect of embodiments of this application, a communication apparatus is provided. The apparatus may exist in a product form of a chip. A structure of the apparatus includes a processor, and may further include a memory. The memory is configured to couple to the processor and store a program (instructions) and data that are necessary for the apparatus. The processor is configured to execute the computer program stored in the memory, to support the communication apparatus to perform the method in any one of the first aspect and the second aspect and the corresponding possible implementations. Optionally, the memory may be located in the processor, and is an internal storage. Alternatively, the processor may be located outside the processor, is coupled to the processor, and is an external storage.

According to an eleventh aspect of embodiments of this application, a communication apparatus is provided. The apparatus may exist in a product form of a chip. A structure of the apparatus includes a processor and an interface circuit. The processor is configured to communicate with another apparatus through a receiving circuit, to enable the apparatus to perform the method in any one of the first aspect and the second aspect and the corresponding possible implementations.

According to a twelfth aspect of embodiments of this application, a communication apparatus is provided, and is configured to perform the method in any one of the first aspect and the second aspect and the corresponding possible implementations.

BRIEF DESCRIPTION OF DRAWINGS

The following describes accompanying drawings used in embodiments of this application.

FIG. 13a is a schematic diagram of a structure of still yet another management frame according to an embodiment of this application;

FIG. 13b is a schematic diagram of a structure of still yet another management frame according to an embodiment of this application;

DESCRIPTION OF EMBODIMENTS

Figure 1:
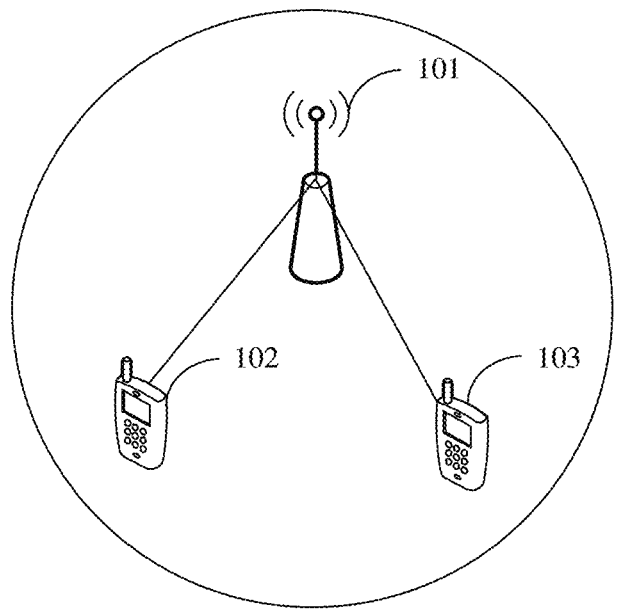
FIG. 1 is a schematic diagram of a structure of a communication system according to an embodiment of this application.

The following first describes related technologies in this application, and then describes embodiments of this application with reference to the accompanying drawings.

An embodiment of this application provides a communication method applied to a wireless communication system. The wireless communication system may be a wireless local area network (WLAN) or a cellular network. The method may be implemented by a communication device in the wireless communication system or a chip or a processor in the communication device. The communication device may be a wireless communication device that supports concurrent transmission performed on a plurality of links. For example, the communication device is referred to as a multi-link device or a multi-band device. For example, in the wireless local area network, the communication device supports communication performed by using IEEE 802.11 series protocols, and the IEEE 802.11 series protocols include: 802.11be, 802.11ax, or 802.11a/b/g/n/ac.

1. Multi-Link Device (MLD), Also Referred to as a Multi-Band Device

The multi-link device MLD includes one or more affiliated stations, and the affiliated station is a logical station. "A multi-link device includes an affiliated station" is also briefly described as "A multi-link device includes a station" in embodiments of this application. The affiliated station may be an access point (AP) or a non-access point station (non-AP STA). For ease of description, in this application, a multi-link device whose affiliated station is an AP may be referred to as a multi-link AP, a multi-link AP device, or an AP multi-link device, and a multi-link device whose affiliated station is a non-AP STA may be referred to as a multi-link STA, a multi-link STA device, or a STA multi-link device.

The multi-link device MLD may implement wireless communication in compliance with 802.11 series protocols, for example, in compliance with an extremely high throughput (EHT) protocol, or in compliance with an 802.11be-based or 802.11be-compatible protocol, thereby implementing communication with another device. Certainly, the another device may be a multi-link device or may not be a multi-link device.

Each logical station may operate on one link, and a plurality of logical stations are allowed to operate on a same link. A link identifier mentioned below represents one station operating on one link. In other words, if there is more than one logical station on one link, more than one link identifier is required to represent the logical stations. The link mentioned below sometimes also indicates a station operating on the link. If data transmission is performed between a multi-link device and another multi-link device, before communication, the multi-link device and the another multi-link device may first negotiate or communicate with each other about a correspondence between a link identifier and a link or a station on a link, or an AP multi-link device indicates a correspondence between a link identifier and a link or a station on a link through a broadcast management frame, for example, a beacon frame. Therefore, during data transmission, the link identifier is carried without transmitting a large amount of signaling information to indicate the link or the station on the link. This reduces signaling overheads and improves transmission efficiency.

The following uses an example in which the foregoing one multi-link device is an AP multi-link device, and the foregoing another multi-link device is a STA multi-link device for description. For example, when the AP multi-link device establishes a BSS, a management frame, for example, a beacon frame, sent by the AP multi-link device carries an element including a plurality of link identifier information fields. Each link identifier information field may indicate a correspondence between a link identifier and a station operating on a link. Each link identifier information field includes a link identifier, and further includes one or more of a MAC address, an operating class, and a channel number. One or more of the MAC address, the operating class, and the channel number may identify a link. For another example, in a multi-link association establishment process, the AP multi-link device and the STA multi-link device negotiate for a plurality of link identifier information fields. In subsequent communication, the AP multi-link device or the STA multi-link device represents a station in the multi-link device by using a link identifier. The link identifier may further represent one or more attributes of a MAC address, an operating class, and a channel number of the station. The MAC address may alternatively be an association identifier of the associated AP multi-link device. Optionally, if a plurality of stations operate on one link, meanings represented by a link identifier (which is a numeric ID) include not only a channel number and an operating class in which the link is located, but also an identifier of a station operating on the link, for example, a MAC address or an AID of a station.

FIG. 1 is a diagram of an application scenario of an embodiment of this application by using a wireless local area network as an example. The application scenario includes: a first station 101 and a second station 102. The first station 101 may communicate with the second station 102 through a plurality of links, to achieve effect of improving a throughput. The first station may be a multi-link device, and the second station may be a single-link device, a multi-link device, or the like. In a scenario, the first station 101 is an AP multi-link device, and the second station 102 is a STA multi-link device or a station (for example, a single-link station). In another scenario, the first station 101 is a STA multi-link device, and the second station 102 is an AP (for example, a single-link AP) or an AP multi-link device. In still another scenario, the first station 101 is an AP multi-link device, and the second station 102 is an AP multi-link device or an AP. In still another scenario, the first station 101 is a STA multi-link device, and the second station 102 is a STA multi-link device or a STA. Certainly, the wireless local area network may further include another device. A quantity and types of devices shown in FIG. 1 are merely examples.

Figure 2A:
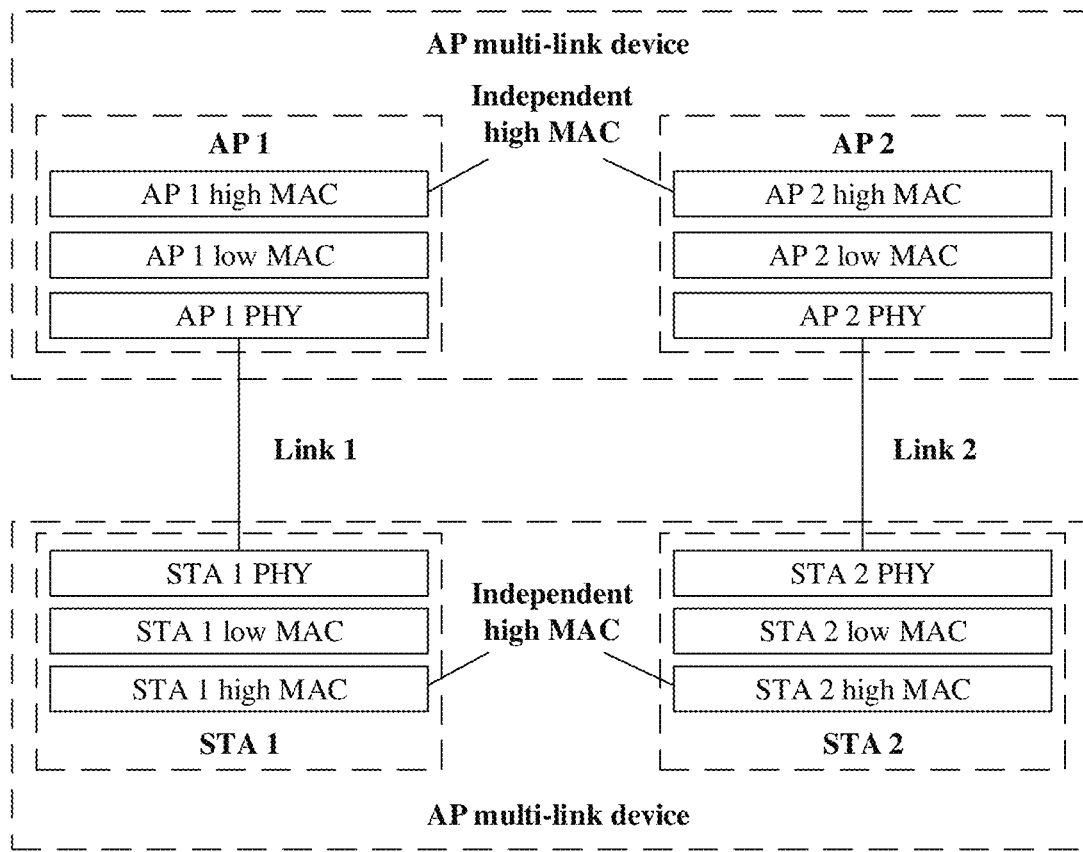
FIG. 2(a) is a schematic diagram of a structure of a multi-link device according to an embodiment of this application.
Figure 2B:
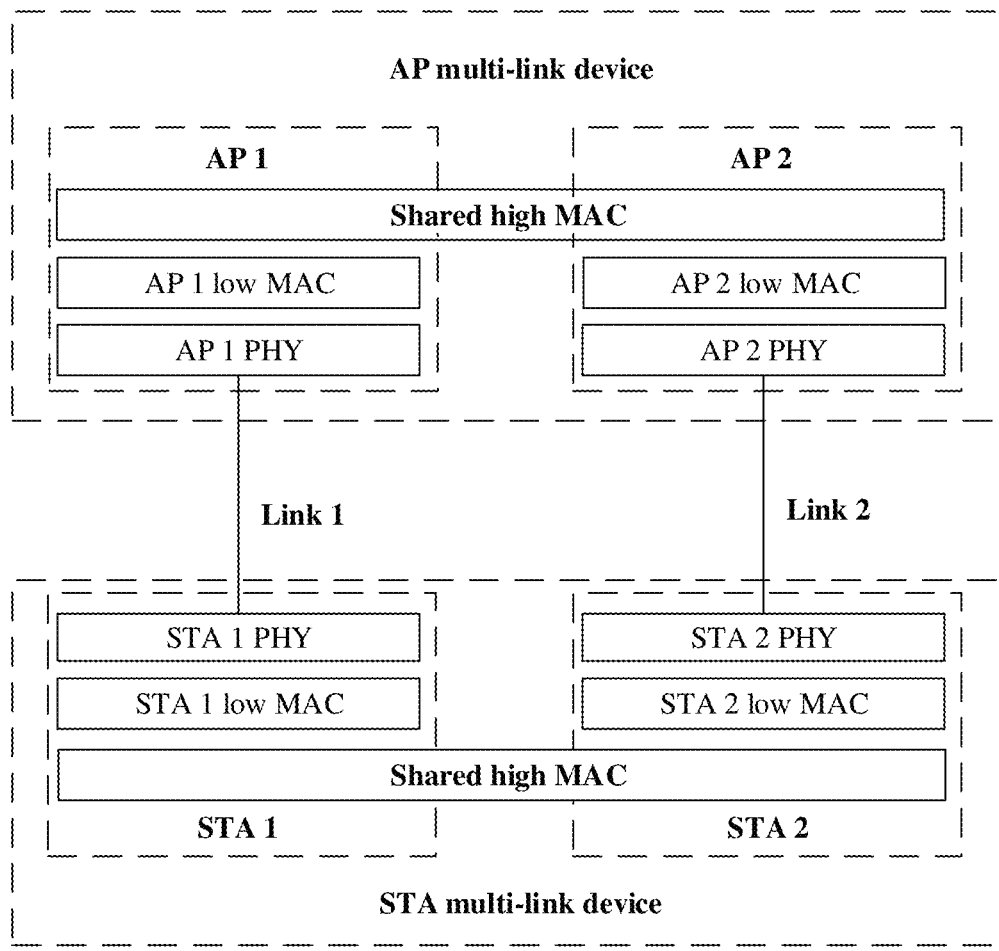
FIG. 2(b) is a schematic diagram of another structure of a multi-link device according to an embodiment of this application.
Figure 2C:
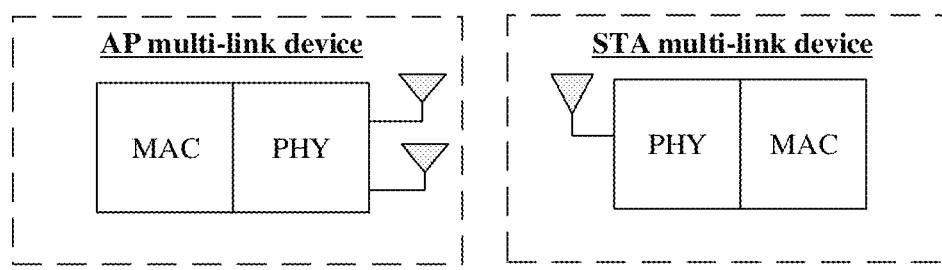
FIG. 2(c) is a schematic diagram of another structure of a multi-link device according to an embodiment of this application.

FIG. 2(*a*) and FIG. 2(*b*) show schematic diagrams of structures of an AP multi-link device and a STA multi-link device that participate in communication. 802.11 standards focus on 802.11 physical layer (PHY) and media access control (MAC) layer parts of an AP multi-link device and a STA multi-link device (such as a mobile phone and a notebook computer).

As shown in FIG. 2(*a*), a plurality of APs included in the AP multi-link device are independent of each other at a low MAC layer and a PHY layer, and are also independent of each other at a high MAC layer. A plurality of STAs included in the STA multi-link device are independent of each other at a low MAC layer and a PHY layer, and are also independent of each other at a high MAC layer.

As shown in FIG. 2(*b*), a plurality of APs included in the AP multi-link device are independent of each other at a low MAC) layer and a PHY layer, and share a high MAC layer. A plurality of STAs included in the STA multi-link device are independent of each other at a low MAC layer and a PHY layer, and share a high MAC layer.

Certainly, the STA multi-link device may use a structure in which high MAC layers are independent of each other, and the AP multi-link device may use a structure in which a high MAC layer is shared. Alternatively, the STA multi-link device may use a structure in which a high MAC layer is shared, and the AP multi-link device may use a structure in which high MAC layers are independent of each other. For example, the high MAC layer or the low MAC layer may be implemented by one processor in a chip system of the multi-link device, or may be implemented by different processing modules in a chip system.

For example, the multi-link device in embodiments of this application may be a single-antenna device, or may be a multi-antenna device. For example, the multi-link device may be a device with more than two antennas. A quantity of antennas included in the multi-link device is not limited in embodiments of this application. For example, FIG. 2(*c*) shows an example in which an AP multi-link device is a multi-antenna device and a STA multi-link device is a single-antenna device. In embodiments of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

Figure 3A:
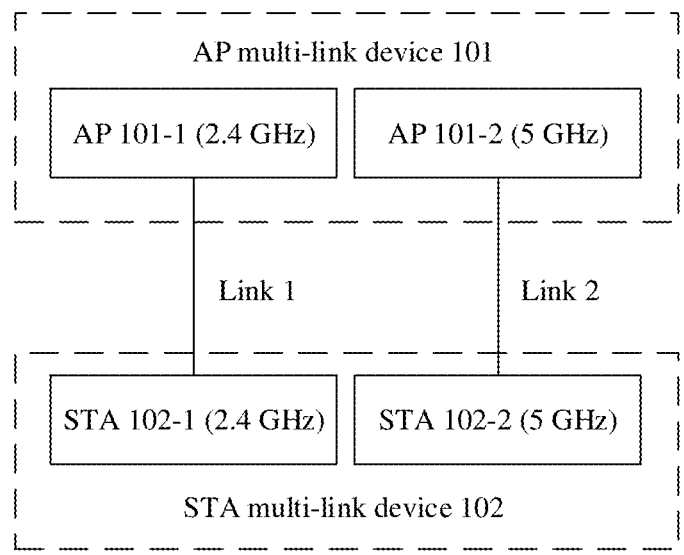
FIG. 3(a) is a schematic diagram of multi-link communication according to an embodiment of this application.
Figure 3B:
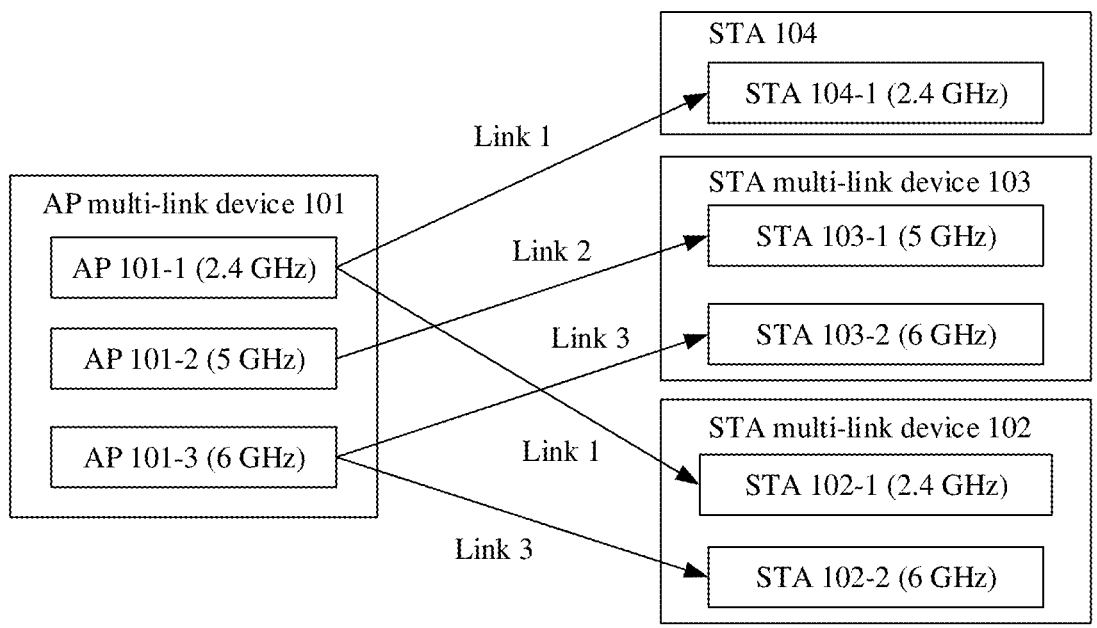
FIG. 3(b) is another schematic diagram of multi-link communication according to an embodiment of this application.

A frequency band on which the multi-link device operates may include but is not limited to sub 1 GHz, 2.4 GHz, 5 GHz, 6 GHZ, and a high frequency 60 GHz. FIG. 3(*a*) and FIG. 3(*b*) show two schematic diagrams of communication between a multi-link device and another device through a plurality of links in a wireless local area network.

FIG. 3(*a*) shows a scenario in which an AP multi-link device 101 communicates with a STA multi-link device 102. The AP multi-link device 101 includes an affiliated AP 101-1 and an affiliated AP 101-2, the STA multi-link device 102 includes an affiliated STA 102-1 and an affiliated STA 102-2, and the AP multi-link device 101 communicate with the STA multi-link device 102 in parallel through a link 1 and a link 2.

FIG. 3(*b*) shows a scenario in which an AP multi-link device 101 communicates with a STA multi-link device 102, a STA multi-link device 103, and a STA 104. The AP multi-link device 101 includes an affiliated AP 101-1 to an affiliated AP 101-3. The STA multi-link device 102 includes two affiliated STAs: a STA 102-1 and a STA 102-2. The STA multi-link device 103 includes two affiliated STAs: a STA 103-1 and a STA 103-2. A STA 103-3 and the STA 104 each are a single-link device. The AP multi-link device may separately communicate with the STA multi-link device 102 through a link 1 and a link 3, communicate with the STA multi-link device 103 through a link 2 and a link 3, and communicate with the STA 104 through a link 1. For example, the STA 104 operates on a 2.4 GHz frequency band. The STA multi-link device 103 includes the STA 103-1 and the STA 103-2, where the STA 103-1 operates on a 5 GHz frequency band, and the STA 103-2 operates on a 6 GHz frequency band. The STA multi-link device 102 includes the STA 102-1 and the STA 102-2, where the STA 102-1 operates on a 2.4 GHz frequency band, and the STA 102-2 operates on a 6 GHz frequency band. The AP 101-1 operating on the 2.4 GHz frequency band in the AP multi-link device may perform uplink or downlink data transmission with the STA 104 and the STA 102-2 in the STA multi-link device 102 through a link 1. The AP 101-2 operating on the 5 GHz frequency band in the AP multi-link device may perform uplink or downlink data transmission with the STA 103-1 operating on the 5 GHz frequency band in the STA multi-link device 103 through a link 2. The AP 101-3 operating on the 6 GHz frequency band in the AP multi-link device 101 may perform uplink or downlink data transmission with the STA 102-2 operating on the 6 GHz frequency band in the STA multi-link device 102 through a link 3, and may also perform uplink or downlink data transmission with the STA 103-2 in the STA multi-link device through the link 3.

It should be noted that FIG. 3(*a*) shows that the AP multi-link device supports only two frequency bands, and FIG. 3(*b*) uses only an example in which the AP multi-link device supports three frequency bands (2.4 GHZ, 5 GHZ, and 6 GHZ), each frequency band corresponds to one link, and the AP multi-link device 101 may operate on one or more of the link 1, the link 2, and the link 3 for illustration. On an AP side or a STA side, the link herein may also be understood as a station operating on the link. In an actual application, the AP multi-link device and the STA multi-link device may further support more or fewer frequency bands. In other words, the AP multi-link device and the STA multi-link device may operate on more links or fewer links. This is not limited in this embodiment of this application.

For example, the multi-link device is an apparatus having a wireless communication function. The apparatus may be a device of an entire system, or may be a chip, a processing system, or the like installed in the device of the entire system. The device on which the chip or the processing system is installed may be controlled by the chip or the processing system, to implement the method and functions in embodiments of this application. For example, the multi-link STA in embodiments of this application has a wireless transceiver function, may support the 802.11 series protocols, and may communicate with the multi-link AP, another multi-link STA, or a single-link device. For example, the multi-link STA is any user communication device that allows a user to communicate with an AP and then with the WLAN. For example, the multi-link STA may be user equipment that can access a network, for example, a tablet computer, a desktop computer, a laptop computer, a notebook computer, an ultra-mobile personal computer (UMPC), a handheld computer, a netbook, a personal digital assistant (PDA), or a mobile phone; or may be an Internet of Things node in the Internet of Things, an in-vehicle communication apparatus in the internet of vehicles, or the like. The multi-link STA may alternatively be a chip or a processing system in the foregoing terminals. The multi-link AP in embodiments of this application is an apparatus that provides a service to the multi-link STA, and may support the 802.11 series protocols. For example, the multi-link AP may be a communication entity such as a communication server, a router, a switch, or a network bridge, or the multi-link AP may include various forms of macro base stations, micro base stations, relay stations, or the like. Certainly, the multi-link AP may further be a chip and a processing system in the various forms of devices, to implement the method and functions in embodiments of this application. In addition, the multi-link device may support high-rate and low-latency transmission. With continuous evolution of application scenarios of a wireless local area network, the multi-link device may be further applied to more scenarios, for example, a sensor node (for example, a smart water meter, a smart electricity meter, and a smart air detection node) in a smart city, a smart device (for example, a smart camera, a projector, a display, a television, a stereo, a refrigerator, and a washing machine) in a smart home, a node in an Internet of Things, an entertainment terminal (for example, a wearable device such as an AR and a VR), a smart device (for example, a printer or a projector) in a smart office, an Internet of Vehicles device in an internet of vehicles, and some infrastructures (for example, a vending machine, a self-service navigation console in a supermarket, a self-service cash register, and a self-service ordering machine) in a daily life scenario. Specific forms of the multi-link STA and the multi-link AP are not specifically limited in embodiments of this application, and are merely examples for description herein. The 802.11 series protocols may include 802.11be, 802.11ax, 802.11a/b/g/n/ac, and the like.

2. Multiple Basic Service Set Identifier (BSSID) Mode

A multiple BSSID set is a combination of some cooperative APs, and all the cooperative APs use a same operating class, a same channel number, and a same antenna port. In the multiple BSSID set, there is only one transmitted BSSID AP, and other APs are non-transmitted BSSID APs. Information about the multiple BSSID set (that is, a multiple BSSID element) is carried in a beacon frame, a probe response frame, or a neighbor report sent by the transmitted BSSID AP. Information about a BSSID of the non-transmitted BSSID AP is derived based on a multiple BSSID element or the like in the foregoing received beacon frame, probe response frame, or neighbor report.

In a multiple BSSID technology, one physical AP may be virtualized into a plurality of logical APs to form a multiple BSSID set. Each virtualized AP manages one BSS, and different logical APs generally have different SSIDs and permission, such as a security mechanism or a transmit opportunity. In the multiple BSSID set, a BSSID of an AP is configured as a transmitted BSSID, which is referred to as a transmitted AP, and BSSIDs of other APs are configured as non-transmitted BSSIDs, which are referred to as non-transmitted APs. Generally, a plurality of APs in the multiple BSSID set may also be understood as a plurality of cooperative AP devices obtained by virtualizing one AP device. Only an AP whose BSSID is a transmitted BSSID can send a management frame, for example a beacon frame and a probe response frame. If a probe request frame sent by a STA is for an AP whose BSSID is a non-transmitted BSSID in a multiple BSSID set, the AP whose BSSID is the transmitted BSSID needs to help respond to the probe response frame. The beacon frame sent by the AP whose BSSID is the transmitted BSSID includes a multiple BSSID element, and the APs whose BSSID is the non-transmitted BSSID cannot send a beacon frame. Association identifiers (AID association identifier) allocated by a plurality of virtual APs to stations managed by the plurality of virtual APs share one space, that is, the AIDs allocated to stations managed by the plurality of virtual BSSs cannot be the same.

In an example, as shown in Table 1, the multiple BSSID element includes an element ID, a length, a maximum BSSID indicator, and a subelement. The maximum BSSID indicator indicates that a maximum quantity of BSSIDs included in the foregoing multiple BSSID set is n, and an optional subelement includes information about each non-transmitted BSSID. A receive end may calculate a value of each BSSID in the multiple BSSID set based on a reference BSSID, the maximum BSSID indicator, and a BSSID index. Each BSSID includes 48 bits. A value of most significant (48-n) bits of each BSSID in the multiple BSSID set is the same as a value of most significant (48-n) bits of the reference BSSID, and a value of least significant n bits of each BSSID in the multiple BSSID set is obtained by performing a modulo operation on a sum of a value of least significant n bits of the reference BSSID and a value of a BSSID index x by using 2n. The reference BSSID (that is, the transmitted BSSID) is carried in a BSSID field in a MAC header of a frame (for example, a beacon frame) including the multiple BSSID element. For a specific calculation method, refer to the 802.11-2016 standard.

TABLE 1

| Multiple BSSID element | | | |
|---|---|---|---|
| Element ID | Length | Maximum BSSID indicator | Optional subelement |
| Byte 1 | 1 | 6 | Variable |

Table 2 may show the "optional subelement" in Table 1.

TABLE 2

| Optional subelement | | |
|---|---|---|
| Subelement ID | Name | Extensible |
| 0 | Non-transmitted BSSID profile | No |
| 1-220 | Reserved | |
| 221 | Vendor-specific | Vendor-defined |
| 222-255 | Reserved | |

In Table 2, the non-transmitted BSSID profile includes an element or elements of one or more APs or DMG STAs having a non-transmitted BSSID, and the non-transmitted BSSID profile includes but is not limited to the following elements:

1. a plurality of other elements in a beacon and a non-transmitted BSSID capability related element that need to be included in each non-transmitted BSSID;
2. an SSID element and a multiple BSSID-index element;
3. an FMS descriptor element that is further included if the multiple BSSID element is carried in the beacon;

4. none of the following elements: timestamp and beacon frame interval fields, a DSSS parameter set, an IBSS parameter set, a country, a channel switch announcement, an extended channel switch announcement, a wide bandwidth channel switch, a transmit power envelope, supported operating classes, an IBSS DFS, ERP information, HT capabilities, an HT operation, VHT capabilities, a VHT operation, a SIG beacon compatibility, a short beacon interval, SIG capabilities, a SIG operation (11ah), and other elements, where these elements usually have same element values as the AP corresponding to the transmitted BSSID; and 5. an optional non-inheritance element: The element is the last element in the non-transmitted BSSID profile. The non-inheritance element includes ID numbers and element ID extension numbers of a series of elements that are in the non-transmitted BSSID and that cannot be inherited from the transmitted BSSID. It should be noted that specific content of the element is omitted herein. Specifically, as shown in Table 3, the non-inheritance element includes an element ID, a length, an element ID extension, an element ID list, and an element ID extension list. The element ID extension number is present only when a value of the element ID is 255.

TABLE 3

Non-inheritance element

| One byte | One byte | One byte | One or more bytes | One or more bytes |
|---|---|---|---|---|
| Element ID | Length | Element ID extension | Element ID list | Element ID extension list |

In a common multiple BSSID technology, a multiple BSSID set is virtualized based on only a single-link device. How to apply the multiple BSSID technology to a multi-link device to provide functions of a plurality of virtual networks is a technical problem that is being studied by a person skilled in the art.

Embodiment 1

Figure 4:
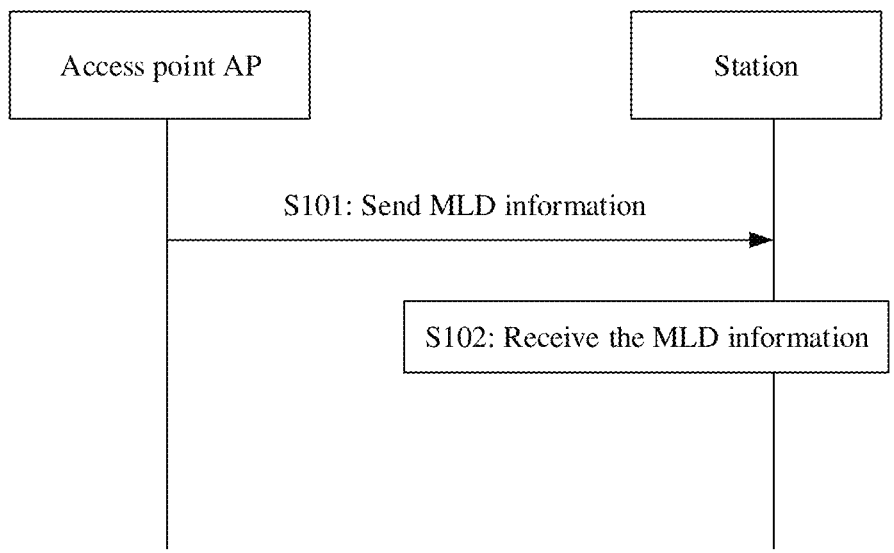
FIG. 4 is a schematic diagram of interaction of a communication method applied to a multi-link device in a WLAN according to an embodiment of this application.

FIG. 4 shows an information indication method based on a multi-link device and multiple BSSIDs according to an embodiment of this application. The method may be applied between stations, between an access point and a station, and between access points. For ease of description, communication between an access point and a station is used as an example in this embodiment of this application.

For ease of description, an AP in a BSS identified by a transmitted BSSID in a multiple BSS set is referred to as a transmitted AP (transmitted BSSID AP), and an AP in a BSS identified by a non-transmitted BSSID is referred to as a non-transmitted AP (non-transmitted BSSID AP). In addition, an AP that sends a management frame carrying information about another AP is referred to as a reporting AP, and another AP in the management frame is referred to as a reported AP. In this embodiment of this application, a device including an AP multi-link device and an AP in a multiple BSSID set in which an AP in the AP multi-link device is located is referred to as a multi-AP multi-link device for short. Certainly, there may be another name. This is not limited in this application. The method involves that one AP in the multi-AP multi-link device sends information about all other APs in the multi-AP multi-link device to a neighboring station, and a signaling structure of the information about the other APs is designed.

The method includes but is not limited to the following steps.

Step S101: An access point sends MLD information to a station.

The access point is an AP in the AP multi-link device. The station that receives the MLD information may be a station in a multi-link station device, or may be a single-link station. Certainly, the MLD information may also be sent by a station, and the station belongs to an MLD. The MLD information may also be received by an access point, and the access point belongs to an MLD, or is a single-link access point. The following descriptions are described by using an example in which the access point sends the MLD information to the station.

The AP that sends the MLD information is included in an MLD, and the MLD further includes one or more other APs, that is, the AP that sends the MLD information and the other APs belong to the MLD. Optionally, the AP further belongs to a multiple BSSID set, and the multiple BSSID set further includes a transmitted AP and one or more non-transmitted APs. Optionally, the other APs in the MLD may alternatively belong to another multiple BSSID set.

In this embodiment of this application, the device including the AP multi-link device and the AP in the multiple BSSID set in which the AP in the AP multi-link device is located is referred to as the multi-AP multi-link device for short. Certainly, there may be another name. This is not limited in this application. It should be noted that, in this embodiment of this application, the AP that sends the MLD information may be referred to as the reporting AP, and another AP indicated in the MLD information in the multi-AP multi-link device is referred to as the reported AP. For example, the multi-AP multi-link device includes an MLD to which the reporting AP belongs, and optionally, further includes another MLD. An AP in the MLD to which the reporting AP belongs and an AP in the another MLD belong to a multiple BSSID set.

The MLD information indicates information about another AP in the multi-AP multi-link device.

The another AP may be one or more of the following:
1. The another AP may include an AP belonging to a same AP MLD as the reporting
2. If the AP belonging to the same AP MLD as the reporting AP belongs to a multiple BSSID set, the another AP further includes another AP in the multiple BSSID set.
3. If the reporting AP belongs to a multiple BSSID set, the another AP further includes another AP belonging to the same multiple BSSID set as the reporting AP.

The MLD information may be carried in one or more MLD elements, or optionally the MLD information may be additionally carried in a multiple BSSID element.

In addition, the management frame sent by the reporting AP further carries information about the reporting AP. For example, currently an 802.11 beacon frame carries the information about the reporting AP.

The station that receives the MLD information may determine, based on the MLD information, information about each reported AP included in the multi-AP multi-link device, an MLD to which each reported AP belongs, and which reported APs and reporting APs belong to a same multiple BSSID set. Further, the station may establish an association with an appropriate AP or AP MLD.

Optionally, the MLD information may be carried in a management frame, for example, a beacon frame, an association response frame, a probe response frame, an authentication frame, or a neighbor report.

The AP multi-link device includes n logical APs that operate on a plurality of links. Therefore, link identifiers link 1, link 2, . . . , and link n may be used to represent the n logical APs. MAC addresses of the APs are different, where n is greater than or equal to 2. An AP multi-link device is identified by using a MAC address of the MLD. In other words, the MAC address is used to identify an AP multi-link device management entity. A MAC address of the AP multi-link device may be the same as one MAC address of the n logical APs included in the multi-link AP, or may be different from all MAC addresses of the n logical APs. For example, the MAC address of the AP multi-link device is a common MAC address, and may identify the AP multi-link device.

In an example, one or more logical APs in the AP multi-link device may belong to one or more multiple basic service set identifier (BSSID) sets. In an example, logical APs in an AP multi-link device belong to different multiple BSSID sets. In another example, a plurality of logical APs in the AP multi-link device may belong to a same multiple BSSID set. For example, if two logical APs in the AP multi-link device operate on one link, the two logical APs may belong to a same multiple BSSID set.

Figure 5:
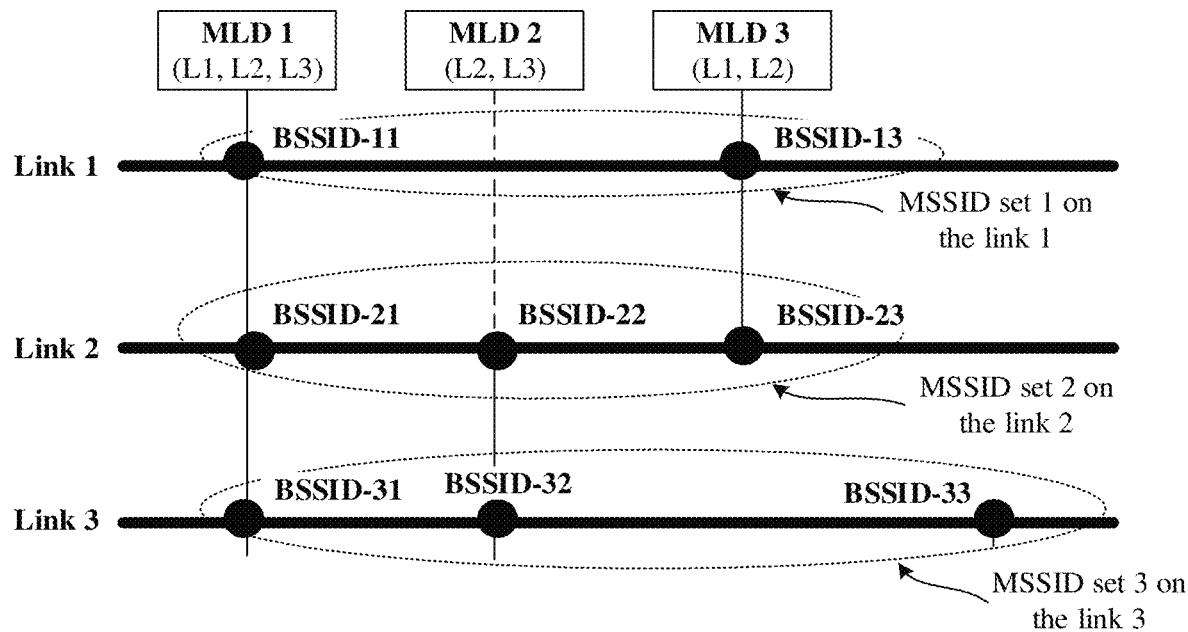
FIG. 5 is a schematic diagram of a structure of a multi-AP multi-link device according to an embodiment of this application.

For example, as shown in FIG. 5, a MAC address of an AP multi-link device is, for example, an MLD 1. The multi-link device includes three logical APs, which are denoted as an AP 11, an AP 21, and an AP 31. The AP 11, the AP 21, and the AP 31 respectively operate on a link 1, a link 2, and a link 3. MAC addresses of the AP 11, the AP 21 and the AP 31 are respectively BSSID-11, BSSID-21, and BSSID-31 (before the 802.11ax is established, a BSSID of a BSS established by an AP is a MAC address of the AP, and may be changed subsequently. For ease of description, an example in which the MAC address of the AP is the BSSID of the BSS established by the AP is used herein). The AP 11 is a member of a multiple BSSID set 1, and the multiple BSSID set 1 further includes an AP 13 whose MAC address is BSSID-13. The AP 21 is a member of a multiple BSSID set 2, and the multiple BSSID set 2 further includes an AP 22 whose MAC address is BSSID-22 and an AP 23 whose MAC address is BSSID-23. The AP 31 is a member of a multiple BSSID set 3, and the multiple BSSID set 3 further includes an AP 32 whose MAC address is BSSID-32 and an AP 33 whose MAC address is BSSID-33. In the following, a device including an AP multi-link device and an AP in a same multiple BSSID set as an AP in the multi-link device is referred to as a multi-AP multi-link device for short. For example, the AP 11, the AP 21, the AP 31, the AP 22, the AP 32, the AP 13, the AP 23, and the AP 33 form a multi-AP multi-link device.

Step S102: The station receives the MLD information sent by the access point AP.

Specifically, after receiving the MLD information broadcast or unicast by the AP, the station parses content in the MLD information. The station may obtain, based on the content parsed out from the MLD information, a structure of the multiple BSSID set based on an AP multi-link device and the information about each reported AP.

Specifically, the station parses the management frame sent by the reporting AP to obtain MLD information about the reporting AP. The MLD information includes one or more MLD elements, and optionally includes a multiple BSSID element. Specifically, the MLD element includes information about a plurality of APs of a same MLD. If the reporting AP belongs to a multiple BSSID set, the MLD information further includes a multiple BSSID element. The multiple BSSID element includes information about another AP belonging to the same multiple BSSID set as the reporting AP, and further includes information about an AP in the same AP MLD as the another AP. It may be understood that the station may obtain, based on the content parsed out from the MLD information, information about another AP in a multi-AP multi-link device in which the reported AP is located.

The station receives the management frame of the AP, and obtains information about the reporting AP and information about another AP in the multi-AP multi-link device in which the reporting AP is located. In this way, the station may establish an association with a corresponding AP or AP multi-link device.

Optionally, after obtaining the information about the multi-AP multi-link device, the station may perform one or more of the following operations:

(1) Associate with one or more APs in the MLD in which the reporting AP is located on one link. For example, in FIG. 5, after the station receives MLD information sent by an AP 11 whose MAC address is BSSID-11 on a link 1, the station may choose to associate with an AP 11 whose MAC address is BSSID-11 and an AP 31 whose MAC address is BSSID-31 in an AP multi-link device MLD 1 in which the AP 11 whose MAC address is BSSID-11 is located.

(2) Associate with an AP in another MLD other than the MLD to which the reporting AP belongs and another AP on one link. The AP in the another MLD and another AP in an MLD to which the transmitted AP belongs belong to a same multiple BSSID set. For example, in FIG. 5, after the station receives MLD information sent by an AP 11 whose MAC address is BSSID-11 on a link 1, the station may choose to associate with an AP 22 whose MAC address is BSSID-22 and an AP 32 whose MAC address is BSSID-32 in an AP multi-link device MLD 2. The AP 22 whose MAC address is BSSID-22 and an AP 21 whose MAC address is BSSID-21 belong to a same multiple BSSID set 2. The AP 32 whose MAC address is the BSSID-32 and an AP 31 whose MAC address is BSSID-31 belong to a multiple BSSID set 3.

Optionally, association herein refers to exchanging one or more of a probe request frame and a probe response frame, an authentication request frame and an authentication response frame, and an association request frame or an association response frame.

In this embodiment of this application, a multiple BSSID technology is applied to a multi-link device, to provide functions of a plurality of virtual networks. In addition, information about an AP in the multi-link device to which the multiple BSSID technology is applied may be sent to a station by using the MLD information. The station may select, based on the MLD information, an appropriate AP or AP multi-link device for association, thereby improving flexibility of station association.

Embodiment 2

This embodiment of this application further describes a specific implementation of a signaling structure of MLD information. According to the flexible signaling structure provided in this embodiment, one or more MLD elements and an MLD element included in a multiple BSSID element are used to describe information about one or more APs in a multi-AP multi-link device, to help a station select an appropriate AP or AP MLD for association. The signaling structure of the MLD information provided in this embodiment of this application is simple and flexible.

First MLD signaling structure: In this embodiment of this application, the MLD information includes one or more MLD elements. One MLD element is used to indicate one MLD in a multi-AP multi-link device. The MLD element includes a common control field, an MLD common information field, and one or more optional subelements. Optionally, the MLD common information field includes an MLD address field, and optionally includes a field, for example, an authentication algorithm field. The MLD address field indicates an address of an MLD indicated by the MLD element, and the address is used to identify one MLD. Optionally, the address of the MLD is a MAC address of the MLD. In other words, the MAC address is used to identify an AP multi-link device management entity. A MAC address of the AP multi-link device may be the same as one MAC address of n APs included in the multi-link AP, or may be different from all MAC addresses of the n APs. For example, the MAC address of the AP multi-link device is a common MAC address, and may identify the AP multi-link device. Optionally, the common control field includes an MLD address existence field (or referred to as an MLD address present field or an MLD address present identifier), to indicate whether there is an MLD address field in the MLD common information field. Optionally, the common control field further includes an authentication algorithm present field, to indicate whether there is an authentication algorithm field in the MLD common information field. Optionally, the "present field" may include one bit. A first value indicates that a corresponding field is present, and a second value indicates that the corresponding field is not present. For example, the first value is 1, and the second value is 0. Optionally, if a reporting AP belongs to a multiple BSSID set, the MLD information further includes a multiple BSSID element.

Optionally, the MLD element may include the following three types:

Type 1: Formal MLD element: The formal MLD element carries information about all or some other APs belonging to a same MLD as the reporting AP. The formal MLD element includes at least one subelement, and each subelement carries information about another AP belonging to the same MLD as the reporting AP. Certainly, the formal MLD element may be referred to as a reporting MLD element, or may have another name. This is not limited in this embodiment of this application. For ease of description, the type 1 MLD element is referred to as the formal MLD element below. A common information field of the formal MLD element includes an MLD address field.

Type 2: Virtual MLD element: The virtual MLD element carries information about all or some APs of another MLD in a multi-AP multi-link device in which the reporting AP is located. Because a plurality of APs included in an MLD to which the reporting AP belongs belong to a plurality of multiple BSSID sets, other APs in the plurality of multiple BSSID sets may form another MLD. The virtual MLD element includes at least one subelement that indicates information about an AP included in the another MLD. It may be understood that the virtual MLD element refers to another MLD different from the MLD to which the reporting AP belongs. Certainly, the virtual MLD element may alternatively have another name. This is not limited in this embodiment of this application. For ease of description, the type 2 MLD element is referred to as the virtual MLD element below. A common information field of the virtual MLD element includes an MLD address field.

Type 3: Special MLD element: The MLD element carries information about a single-link AP in a multi-AP multi-link device in which the reporting AP is located. Because a plurality of APs included in an MLD to which the reporting AP belongs belong to a plurality of multiple BSSID sets, other APs in the plurality of multiple BSSID sets may form another MLD. Certainly, another AP in the plurality of multiple BSSID sets may not belong to any MLD, but is a single-link AP. For example, a common information field of the special MLD element does not include an MLD address field. For another example, the special MLD element may also be considered as a virtual MLD element, and a common information field of the special MLD element also includes an MLD address field. In this case, an MLD address in the MLD element is a MAC address of the single-link AP or a BSSID of the single-link AP.

To distinguish the foregoing three types of MLD elements, so as to help the station determine which MLD element in the MLD information is for the MLD in which the reporting AP is located, which MLD element is for another MLD, and which element is for the single-link AP, type information indicating an MLD element type is carried in the MLD element in this embodiment of this application, so that the station can determine the type of the MLD based on the information, to determine a structure and a relationship between all MLDs in the multi-AP multi-link device.

The type information indicating the MLD element type may include but is not limited to the following implementations:

A first implementation: A virtual MLD field is carried in an MLD element to indicate whether the MLD element is a virtual MLD element. For example, the virtual MLD field includes 1 bit, which is an indicator bit and indicates whether the MLD element is the virtual MLD element. For example, if a value of the 1 bit is a first value (for example, 1), it indicates that the MLD element is the virtual MLD element. If a value of the 1 bit is a second value (for example, 0), it indicates that the MLD element is not the virtual MLD element.

In addition, a special MLD field is carried in the MLD element to indicate whether the MLD element is a special MLD element. For example, the special MLD field includes 1 bit, which is an indicator bit and indicates whether the MLD element is the special MLD element. For example, if a value of the 1 bit is a first value (for example, 1), it indicates that the MLD element is the special MLD element. If a value of the 1 bit is a second value (for example, 0), it indicates that the MLD element is not the special MLD element.

Optionally, if the virtual MLD field indicates that an MLD element is not a virtual MLD element, and the special MLD field indicates that the MLD element is not a special MLD element, it implicitly indicates that the MLD element is a formal MLD element.

For example, if the MLD element is a formal MLD element, the MLD address present field in the common control field is set to the first value, for example, 1, it indicates that there is the MLD address field in the MLD common information field. The virtual MLD field is set to the second value, for example, 0, it indicates that the MLD is not a virtual MLD. The special MLD field is set to the second value, for example, 0, it indicates that the MLD is not a special MLD.

If the MLD element is a virtual MLD element, the MLD address present field in the common control field is set to the first value, for example, 1, it indicates that there is the MLD address field in the MLD common information field. The virtual MLD field is set to the first value, for example, 1, it indicates that the MLD is a virtual MLD. The special MLD field is set to the second value, for example, 0, it indicates that the MLD is not a special MLD.

If the MLD element is a special MLD element, the MLD address present field in the common control field is set to the second value, for example, 0, it indicates that there is no MLD address field in the MLD common information field, or that there is no MLD common information field. The virtual MLD field is set to the second value, for example, 0, it indicates that the MLD is not a virtual MLD. The special MLD field is set to the first value, for example, 1, it indicates that the MLD is a special MLD.

A second implementation: An MLD type indicator field is carried in an MLD element to indicate a type of the MLD element. For example, the MLD type indicator field includes 2 bits. A first value indicates that the MLD element is a formal MLD element, a second value indicates that the MLD element is a virtual MLD element, and a third value indicates that the MLD element is a special MLD element.

Certainly, it should be noted that the MLD element may include only two types: a formal MLD element and a virtual MLD element. A special MLD element can be considered as a virtual MLD element. In this case, the information indicating the MLD element type may include a virtual MLD field, but does not include a special MLD field. If a value of the virtual MLD field is the first value, it indicates that an MLD element in which the MLD field is located is a virtual MLD element. If a value of the virtual MLD field is the second value, it indicates that an MLD element in which the MLD field is located is a formal MLD element. For example, the virtual MLD field includes 1 bit, where 1 indicates that the MLD element is a virtual MLD element, and 0 indicates that the MLD element is a formal MLD element. Certainly, optionally the type information in the MLD element may alternatively be a formal MLD field, to indicate whether the MLD element is a formal MLD element. For example, if a value of the formal MLD field is the first value, it indicates that the MLD element is a formal MLD element. If a value of the formal MLD field is the second value, it indicates that the MLD element is a virtual MLD element. For example, the formal MLD field is 1 bit, the first value is 1, and the second value is 0.

Figure 6A:
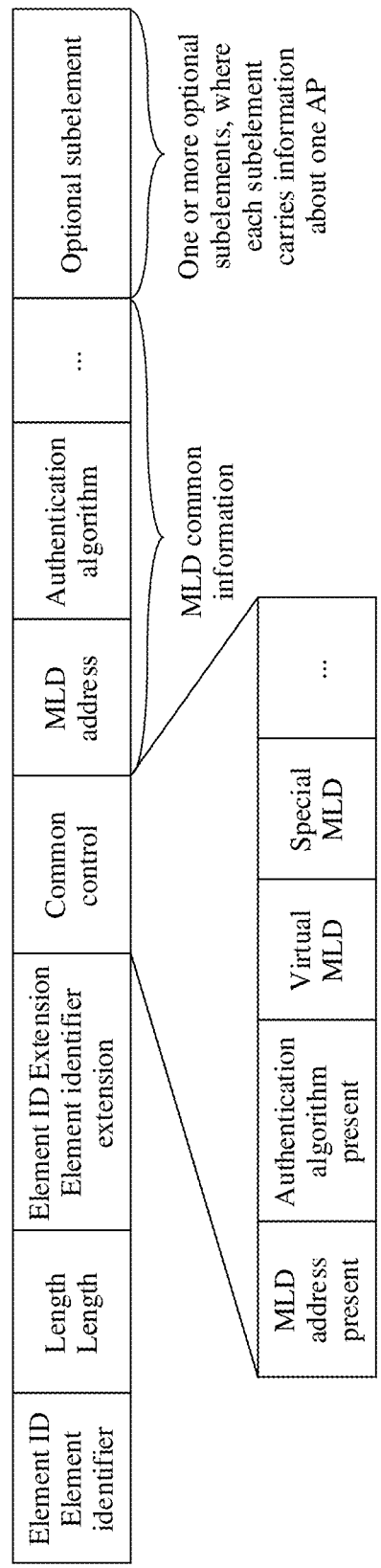
FIG. 6a is a schematic diagram of a structure of an MLD element according to an embodiment of this application.

FIG. 6a is a schematic diagram of a structure of an MLD element. The MLD element includes an element identifier, a length, an element identifier extension field, a common control field, an MLD common information field, and one or more optional subelements. The common control field includes a virtual MLD field and a special MLD field. Optionally, the common control field further includes an MLD address present field. The MLD common information field includes an MLD address field. Optionally, the common control field further includes an authentication algorithm present field, to indicate whether an authentication algorithm field is present in the MLD common information field.

Figure 6B:
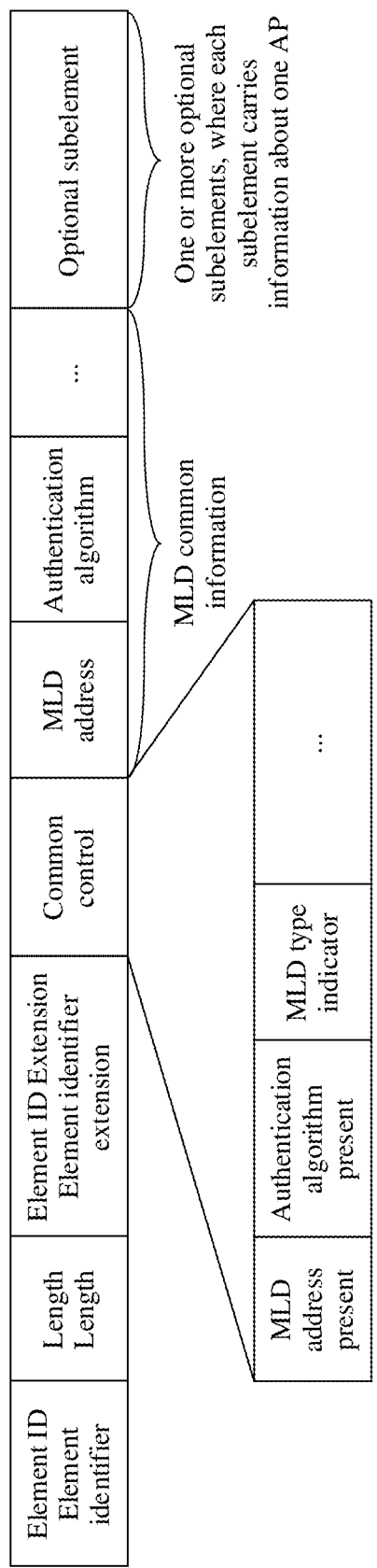
FIG. 6b is a schematic diagram of a structure of another MLD element according to an embodiment of this application.

FIG. 6b is a schematic diagram of a structure of another MLD element. The MLD element includes an element identifier, a length, an element identifier extension field, a common control field, an MLD common information field, and one or more optional subelements. The common control field includes an MLD type indicator. Optionally, the MLD common control field further includes an MLD address present field. The MLD common information field includes an MLD address field. Optionally, the common control field further includes an authentication algorithm present field, to indicate whether an authentication algorithm field is present in the MLD common information field.

Optionally, one MLD element further includes one or more subelements, and one subelement describes information about one AP in the multi-AP multi-link device. For a subelement in a formal MLD element, information about another AP belonging to the same MLD as the reporting AP is described. For a subelement in a virtual MLD element, information about an AP in an MLD indicated by the MLD address field is described. For a subelement in a special MLD element, information about a single-link AP in a plurality of multiple BSSID sets including APs in the AP multi-link device is described.

Content of each subelement includes a link identifier of the AP. Optionally, each subelement further includes fields related to the AP, such as an SSID field, a timestamp field, a beacon interval field, and an element of the AP. The element of the AP is, for example, a BSS load element, an EHT capability element, or an EHT operation element.

For example, an inheritance principle is used for a field or an element carried in a subelement that describes information about an AP. Details are as follows: If the field or element carried in the subelement is the same as a field or element of the reporting AP, a corresponding field and element of the reported AP do not need to be carried in a corresponding subelement of the reported AP. If the field or element carried in the subelement is different from a field or element of the reporting AP, a corresponding field and element of the reported AP need to be carried in a corresponding subelement of the reported AP.

For another example, a non-inheritance element is used as a field or an element carried in a subelement that describes information about an AP. The non-inheritance element is the last element in the subelement. The non-inheritance element includes ID numbers and element ID extension numbers of a series of elements that cannot be inherited from the reporting AP. It should be noted that specific content of the element is omitted herein. Specifically, as shown in Table 3, the non-inheritance element includes an element ID, a length, an element ID extension, an element ID list, and an element ID extension list. The element ID extension number is present only when a value of the element ID is 255.

The link identifier of the AP is in one-to-one correspondence with an operating class in which the AP is located, a channel number, and a BSSID (MAC address) of the AP, and the one-to-one correspondence may be carried by another element, for example, a reduced neighbor report (RNR) element described in Embodiment 3.

Figure 7:
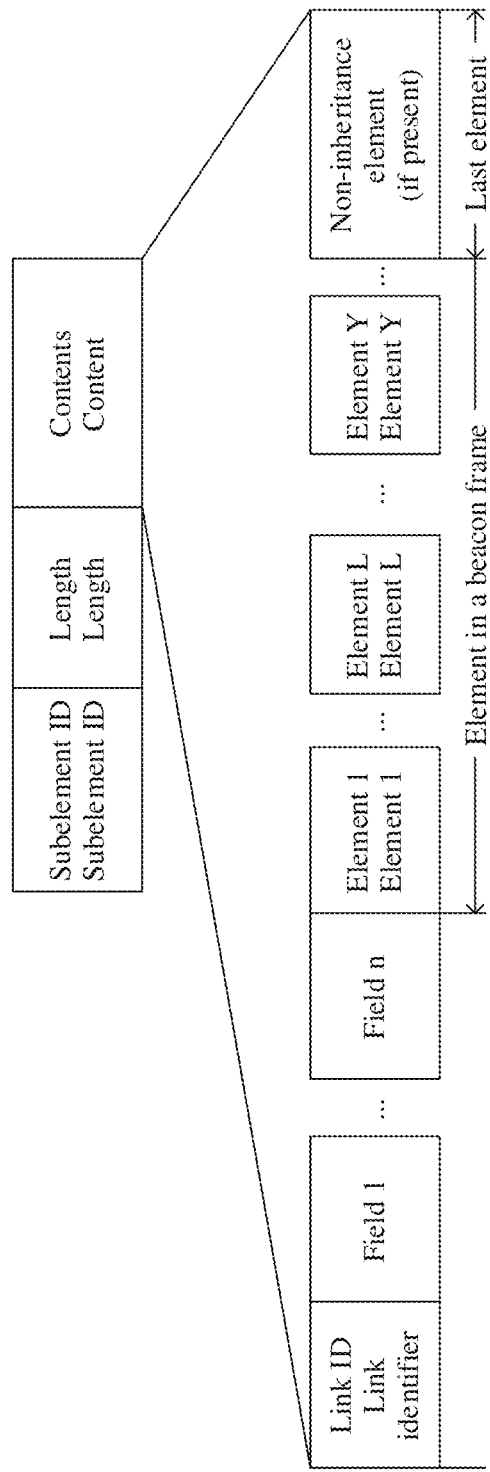
FIG. 7 is a schematic diagram of a structure of a subelement in an MLD element according to an embodiment of this application.

FIG. 7 is a schematic diagram of a structure of a subelement according to an embodiment of this application. The subelement includes a subelement ID, a length, and a content field. The content field includes a link identifier of an AP corresponding to the subelement. There is a correspondence between the link identifier and an operating class in which the AP is located, a channel number, and a BSSID (MAC address) of the AP, that is, a station that parses the subelement may learn an operating class, a channel number, and a BSSID of the AP based on the link identifier and the correspondence between the link identifier and the three parameters. The content field further includes a field 1, . . . , a field n, for example, an SSID field, a timestamp field, and a beacon interval field. The content field further includes an element 1, . . . , an element n, for example, a BSS load element, an EHT capability element, and an EHT operation element. The last element may be a non-inheritance element. The non-inheritance element includes ID numbers and element ID extension numbers of a series of elements that cannot be inherited from the reporting AP.

Figure 6C:
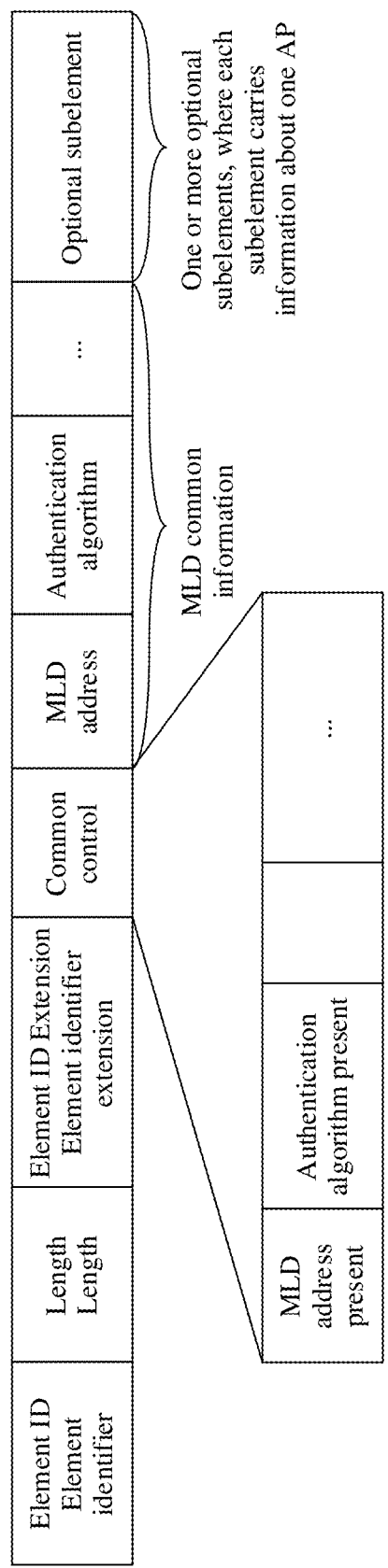
FIG. 6c is a schematic diagram of a structure of still another MLD element according to an embodiment of this application.

For example, if the reporting AP belongs to a multiple BSSID set, a management frame that carries MLD information and that is sent by the reporting AP further carries information that is in a multiple BSSID element (only a transmitted BSSID AP can send the management frame) and that indicates non-transmitted BSSID APs belonging to the same multiple BSSID set as the reporting AP. The information that is in the multiple BSSID element and that indicates the non-transmitted BSSID APs in the multiple BSSID set is referred to as a non-transmitted profile. If one of the non-transmitted BSSID APs belongs to an AP MLD, the non-transmitted profile further carries an MLD element. The MLD element is a formal MLD element, as shown in FIG. 6a, FIG. 6b, or FIG. 6c. Each subelement in the MLD element carries information about another AP belonging to the same AP MLD as the non-transmitted BSSID AP. The inheritance principle mentioned above is used for a field or element carried in a subelement that describes the information about the another AP. In this case, there are two manners for an object of the inheritance principle. Manner 1: As described above, the inherited object is still the reporting AP. Manner 2: The inherited object is changed to the non-transmitted BSSID AP.

The first signaling structure of MLD information is applicable to a plurality of multi-AP multi-link devices.

Solution 1: A structure of a multi-AP multi-link device. Transmitted BSSID APs in a plurality of multiple BSSID sets are not from a same AP multi-link device. In other words, a same AP multi-link device includes one transmitted BSSID AP belonging to a multiple BSSID set, and may further include one non-transmitted BSSID AP belonging to another multiple BSSID set. For example, an AP 1 in one AP multi-link device (MLD 1) is a transmitted BSSID AP in a multiple BSSID set 1, and an AP 2 in the AP multi-link device (MLD 1) is a non-transmitted BSSID AP in a multiple BSSID set 2. In this case, a network formed by multiple BSSIDs of the multi-link device is more flexible, and is more suitable for service requirements of different stations.

Figure 10A:
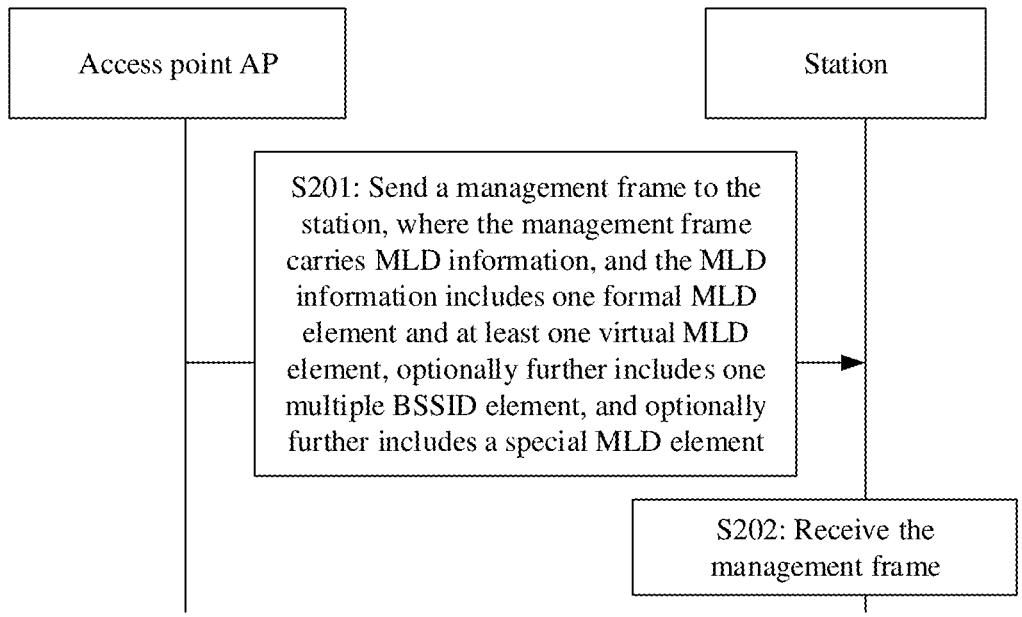
FIG. 10a is a schematic flowchart of a signaling information exchange method for a multi-AP multi-link device according to an embodiment of this application.

According to the foregoing first signaling structure and the multi-AP multi-link device in Solution 1, this embodiment of this application provides a signaling information exchange method for the multi-AP multi-link device. For example, as shown in FIG. 10a, the method includes the following steps.

Step S201: An access point sends a management frame to a station. The management frame carries MLD information. The MLD information includes: one formal MLD element and at least one virtual MLD element, optionally further includes one multiple BSSID element, and optionally further includes a special MLD element.

The access point belongs to an access point MLD. For example, the access point is an AP in an AP multi-link device, and the access point is referred to as the reporting AP. The station that receives the management frame may be a station in a multi-link station device, or may be a single-link station.

The management frame is, for example, a beacon frame, an association response frame, a probe response frame, an authentication frame, or a neighbor report. The MLD information carries information about another AP (referred to as a reported AP) that shares a device with the reporting AP.

The reported AP may be at least one of the following:
1. The reported AP may include another AP belonging to a same AP MLD as the reporting AP.
2. If the another AP belonging to the same AP MLD as the reporting AP belongs to a multiple BSSID set, the reported AP further includes another AP in the multiple BSSID set.
3. If the reporting AP belongs to the multiple BSSID set, the reported AP further includes another AP belonging to the same multiple BSSID set as the reporting AP.

In the first signaling structure of the MLD information, the MLD information includes a formal MLD element and a virtual MLD element, and optionally further includes a special MLD element. The formal MLD element includes information about one or more other APs in a first MLD to which the reporting AP belongs, that is, the formal MLD element includes subelements, and one subelement carries information about another AP in the first MLD. Optionally, if the reporting AP belongs to a first multiple BSSID set, the MLD information further includes a multiple BSSID element. Optionally, the multiple BSSID element includes information about one or more or all other APs in the first multiple BSSID set to which the reporting AP belongs. If another AP in the first MLD belongs to a second multiple BSSID set, and an AP included in the second multiple BSSID set belongs to a second MLD, the MLD information further includes one virtual MLD element. The virtual MLD element includes information about an AP in the second MLD, for example, the virtual MLD element includes subelements, and one subelement carries information about one AP in the second MLD. If another AP in the first MLD belongs to a third multiple BSSID set, and an AP included in the third multiple BSSID set does not belong to any MLD, the MLD information includes a special MLD element or a virtual MLD element. The MLD element includes a subelement that carries information about the AP that does not belong to any MLD. Further, if a non-transmitted AP in the first multiple BSSID set further belongs to a third MLD, the multiple BSSID element further includes a fourth MLD element. The fourth MLD element may be a formal MLD element that carries information about another AP in the third MLD. In other words, the MLD information may be carried in one or more MLD elements, or optionally, information about the reported AP may be additionally carried in the multiple BSSID element.

In addition, the management frame sent by the reporting AP further carries information about the reporting AP. For example, currently an 802.11 beacon frame carries the information about the reporting AP.

It should be noted that the MLD information may also be referred to as MLD multiple BSSID information and the like. Certainly, the MLD information may have another name. This is not specifically limited in this embodiment of this application.

Step S202: The station receives the management frame sent by the access point.

Specifically, the station parses the management frame sent by the reporting AP to obtain the MLD information about the reporting AP. The MLD information includes one or more MLD elements, and optionally includes a multiple BSSID element. Specifically, if the reporting AP belongs to the first multiple BSSID set, the MLD information further includes the multiple BSSID element. The multiple BSSID element includes information about another AP belonging to the same first multiple BSSID set as the reporting AP, and optionally, further includes information about an AP in a same third AP MLD as the another AP.

It may be understood that, optionally the method further includes step S203: The station may learn, based on content parsed from the MLD information, a structure of the multiple BSSID set based on the AP multi-link device and the information about each reported AP.

The station receives the management frame, and learns, based on the management frame, information about the reporting AP and information about the another AP that shares the device with the reporting AP. In this way, the station may select a corresponding AP or AP multi-link device to establish an association.

This embodiment of this application provides signaling information. The signaling information carries information about each AP in a multi-link device to which a multiple BSSID technology is applied. The signaling structure is simple, and can carry, for example, information about all other APs of the multi-AP multi-link device. In addition, the signaling structure provided in this embodiment of this application is applicable to a multi-AP multi-link device including a plurality of multi-link devices to which the multiple BSSID technology is applied. The signaling structure is highly flexible and simple.

Figure 8A:
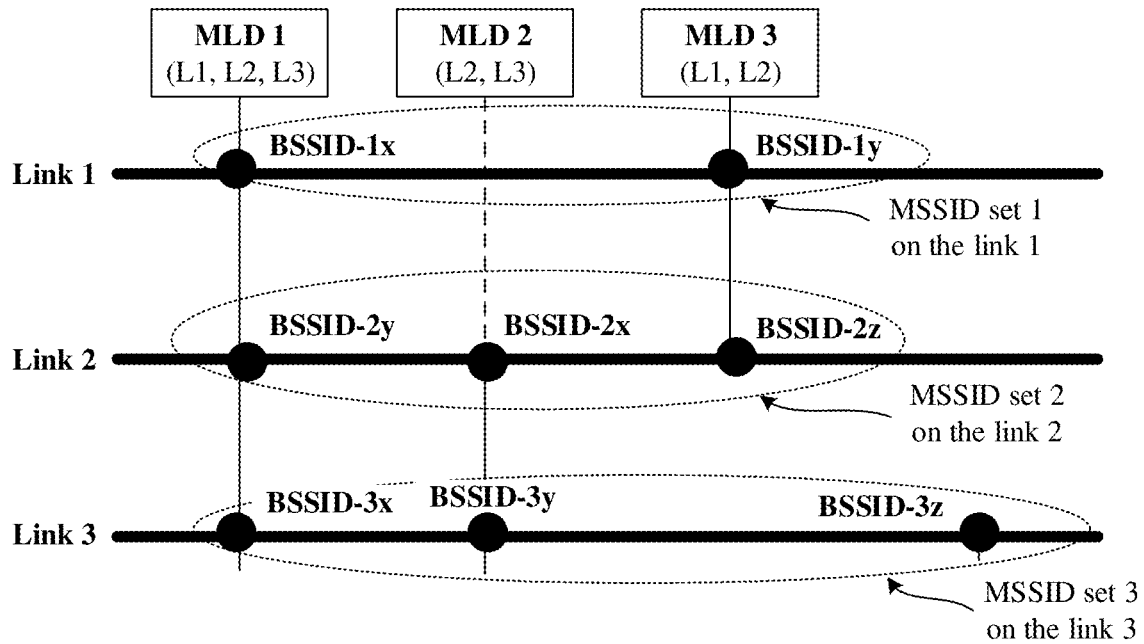
FIG. 8a is a schematic diagram of a structure of another multi-AP multi-link device according to an embodiment of this application.

The following describes an architecture of a multi-AP multi-link device in Solution 1. FIG. 8*a* is a schematic diagram of a structure of the multi-AP multi-link device in Solution 1. An AP whose MAC address identifier ends with x is a transmitted BSSID AP, and an AP whose MAC address identifier ends with y or z is a non-transmitted BSSID AP. For example, a transmitted BSSID AP in the multiple BSSID set 1 is an AP 1x whose MAC address identifier is BSSID-1x, and a non-transmitted BSSID AP in the multiple BSSID set 1 is an AP 1y whose MAC address identifier is BSSID-1y. A transmitted BSSID AP in the multiple BSSID set 2 is an AP 2x whose MAC address identifier is BSSID-2x, and non-transmitted BSSID APs in the multiple BSSID set 2 include an AP 2y whose address identifier is BSSID-2y and an AP 2z whose MAC address identifier is BSSID-2z. A transmitted BSSID AP in the multiple BSSID set 3 is an AP 3x whose MAC address identifier is BSSID-3x, and non-transmitted BSSID APs in the multiple BSSID set 3 include an AP 3y whose MAC address identifier is BSSID-3y and an AP 3z whose MAC address identifier is BSSID-3z. It can be seen from FIG. 8*a* that transmitted BSSID APs (namely, transmitted APs) from different multiple BSSID sets are distributed in different AP multi-link devices, for example, the AP 1x whose MAC address is BSSID-1x and the AP 2x whose MAC address is BSSID-2x are respectively in the AP multi-link device MLD 1 and the AP multi-link device MLD 2.

For ease of understanding, in this embodiment of this application, FIG. 8*a* is used as an example to describe signaling structures of MLD information in several cases.

Figure 9A:
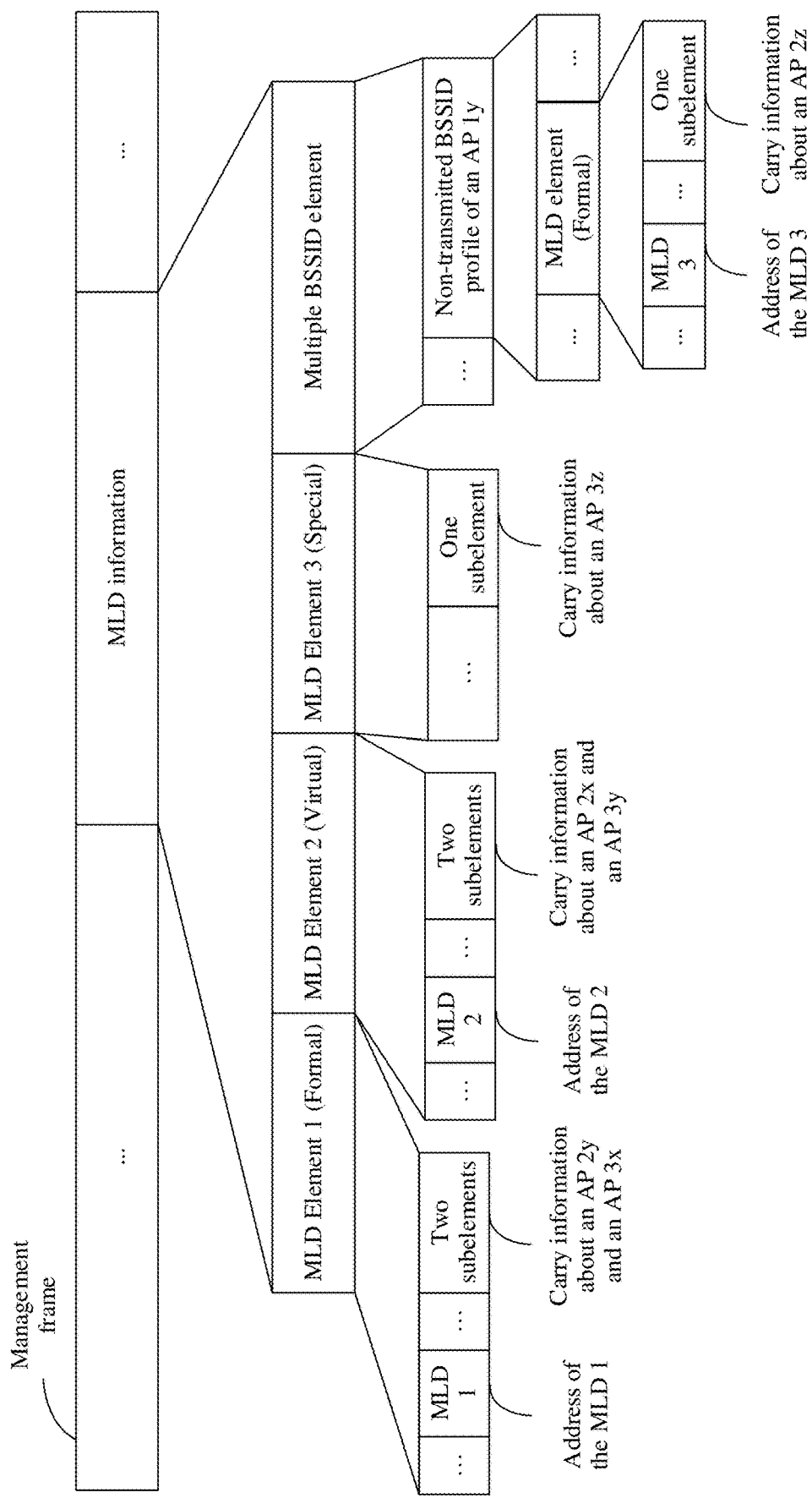
FIG. 9a is a schematic diagram of a structure of a management frame according to an embodiment of this application.

Example 1: The AP 1x in the AP MLD 1 shown in FIG. 8*a* sends a management frame, for example, a beacon frame or a probe response frame. A sending manner may be broadcast or unicast. Therefore, the AP 1x is a reporting AP. As shown in FIG. 9*a*, MLD information carried in the management frame includes three MLD elements. A first MLD element is a formal MLD element, a common information field includes an address of the AP MLD 1, the formal MLD element carries two subelements, a first subelement carries information about the AP 2y, and a second subelement carries information about the AP 3x. The second MLD element is a virtual MLD element, a common information field includes an address of the AP MLD 2, the virtual MLD element carries two subelements, a first subelement carries information about the AP 2x, and a second subelement carries information about the AP 3y. The third MLD element is a special MLD element, a common information field does not exist or an MLD address field does not exist. The special MLD element carries one subelement, and the subelement carries information about the AP 3z. In addition, because the reporting AP 1x belongs to the multiple BSSID set 1, the MLD information of the management frame further needs to carry a multiple BSSID element. The element carries a non-transmitted BSSID profile, and the non-transmitted BSSID profile is information about the AP 1y. In addition, because the AP 1y belongs to the AP MLD 3, the non-transmitted BSSID profile further additionally carries a fourth MLD element. The fourth MLD element may be a formal MLD element, and the formal MLD element means that the AP 2z and the AP 1y belong to a same MLD. The common information field of the MLD element includes an address of the AP MLD 3. The MLD element carries one subelement, and the subelement carries information about the AP 2z. Correspondingly, the station that receives the management frame may learn, based on the three MLD elements and the multiple BSSID element that are carried in the MLD information, information about each AP in the multi-AP multi-link device and a relationship between the APs. For example, the station may learn, based on the first MLD element, that the AP 1x, the AP 2y, and the AP 3x all belong to the MLD 1. The station may learn, based on the second MLD element, that the AP 2x and the AP 3y both belong to the MLD 2. The station may learn, based on the third MLD element, that the AP 3z is a single-link device. The station may learn, based on the multiple BSSID element, that the AP 1y and the AP 1x belong to one multiple BSSID set. The station may learn, based on an MLD element included in the multiple BSSID element, that the AP 1y and the AP 2z both belong to the MLD 3.

Figure 9B:
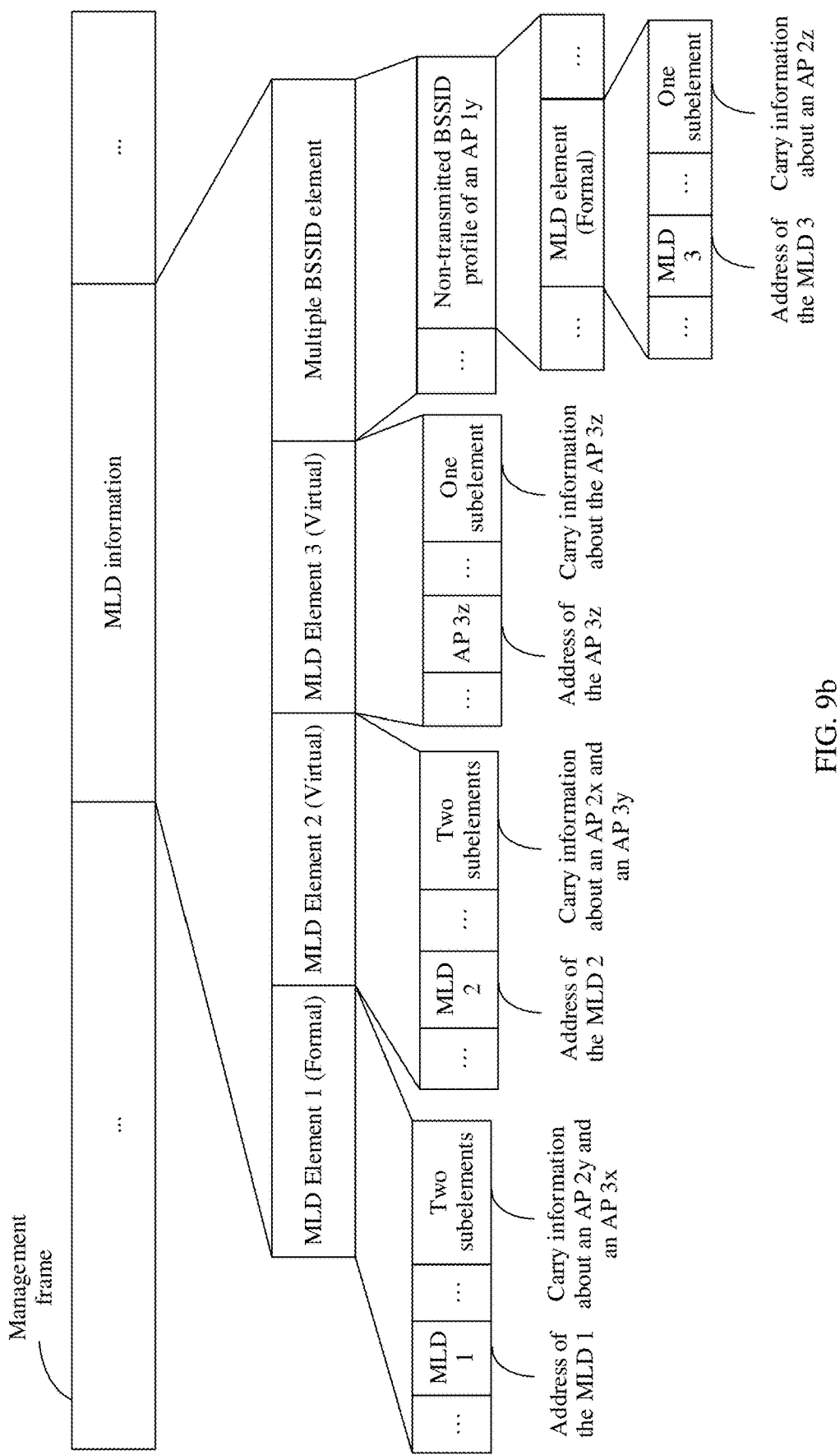
FIG. 9b is a schematic diagram of a structure of another management frame according to an embodiment of this application.

Example 2: The AP 1x in the AP MLD 1 shown in FIG. 8*a* sends a management frame, for example, a beacon frame or a probe response frame. A sending manner may be broadcast or unicast. As shown in FIG. 9*b*, the management frame carries MLD information. The MLD information includes three MLD elements. A first MLD element is a formal MLD element, a common information field of the first MLD element includes an address of the AP MLD 1, two subelements are carried, a first subelement carries information about the AP 2y, and a second subelement carries information about the AP 3x. The second MLD element is a virtual MLD element, a common information field of the second MLD element includes an address of the AP MLD 2, two subelements are carried, a first subelement carries information about the AP 2x, and a second subelement carries information about the AP 3y. The third MLD element is a virtual MLD element, a common information field of the third MLD element includes an address of the AP 3z and carries one subelement, and the subelement carries information about the AP 3z. Because the reporting AP 1x belongs to a multiple BSSID set, the MLD information of the management frame further needs to carry a multiple BSSID element. The element carries a non-transmitted BSSID profile, and the non-transmitted BSSID profile is information about the AP 1y. In addition, because the AP 1y belongs to the AP MLD 3, the non-transmitted BSSID profile further additionally carries a formal MLD element. A common information field of the formal MLD element includes an address of the AP MLD 3 and carries one subelement, and the subelement carries information about the AP 2z. It should be noted that, a special MLD element no longer exists in the example. Correspondingly, the station that receives the management frame may learn, based on the three MLD elements and the multiple BSSID element that are carried in the MLD information, information about each AP in the multi-AP multi-link device and a relationship between the APs. For example, the station may learn, based on the first MLD element, that the AP 1x, the AP 2y, and the AP 3x all belong to the MLD 1. The station may learn, based on the second MLD element, that the AP 2x and the AP 3y both belong to the MLD 2. The station may learn, based on the third MLD element, that the AP 3z in the third MLD element is a single-link device. The station may learn, based on the multiple BSSID element, that the AP 1y and the AP 1x belong to one multiple BSSID set. The station may learn, based on an MLD element included in the multiple BSSID element, that the AP 1y and the AP 2z both belong to the MLD 3.

Figure 9C:
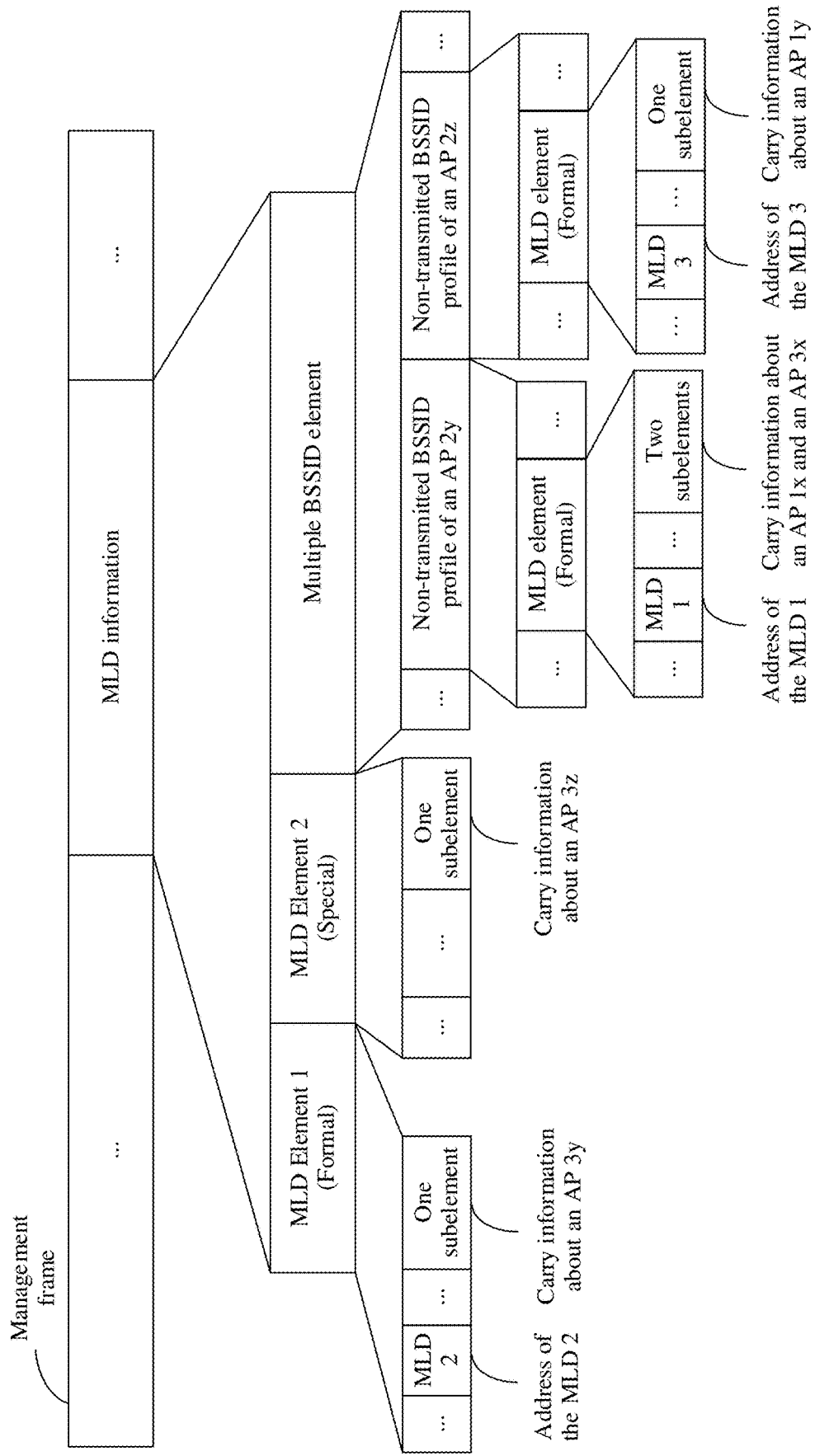
FIG. 9c is a schematic diagram of a structure of still another management frame according to an embodiment of this application.

Example 3: The AP 2x in the AP MLD 2 shown in FIG. 8a sends a management frame, for example, a beacon frame or a probe response frame. A sending manner may be broadcast or unicast. As shown in FIG. 9c, the management frame carries MLD information. The MLD information carries two MLD elements. One MLD element is a formal MLD element, a common information field in the formal MLD element includes an address of the AP MLD 2, one subelement is carried, and the subelement carries information about the AP 3y. The other MLD element is a special MLD element, a common information field does not exist, one subelement is carried, and the subelement carries information about the AP 3z. Because the reporting AP 2x belongs to a multiple BSSID set, the MLD information of the management frame further needs to carry a multiple BSSID element. The element carries two non-transmitted BSSID profiles. One non-transmitted BSSID profile is information about the AP 2y. In addition, because the AP 2y belongs to the AP MLD 1, the non-transmitted BSSID profile of the AP 2y further additionally carries a formal MLD element. A common information field of the formal MLD element includes an address of the AP MLD 1. The formal MLD element carries two subelements. One subelement carries information about the AP 1x, and the other subelement carries information about the AP 3x. The other non-transmitted BSSID profile is information about the AP 2z. In addition, because the AP 2z belongs to the AP MLD 3, the non-transmitted BSSID profile of the AP 2z further additionally carries a formal MLD element. A common information field of the formal MLD element includes an address of the AP MLD 3 and carries one subelement, and the subelement carries information about the AP 1y. Correspondingly, the station that receives the management frame may learn, based on the two MLD elements and the multiple BSSID element that are carried in the MLD information, information about each AP in the multi-AP multi-link device and a relationship between the APs. For example, the station may learn, based on an MLD element 1, that the AP 2x and the AP 3y both belong to an MLD 2. The station may learn, based on an MLD element 2, that the AP 3z is a single-link device. The station may learn, based on the multiple BSSID element, that the AP 2x, the AP 2y, and the AP 2z all belong to one multiple BSSID set. It may be determined, based on the MLD element carried in the non-transmitted BSSID profile of the AP 2y in the multiple BSSID element, that the AP 1x, the AP 2y, and the AP 3x belong to the MLD 1. It may be determined, based on the MLD element carried in the non-transmitted BSSID profile of the AP 2z in the multiple BSSID element, that the AP 1y and the AP 2z belong to the MLD 3.

It should be noted that a location of the MLD element and a location of the multiple BSSID element are merely examples, and are not limited to the order shown in FIG. 9a to FIG. 9c in embodiments of this application. It may be understood that, because each MLD element includes a type identifier, the station may determine the type of the MLD element based on the type identifier. Therefore, locations of a plurality of MLD elements may also be arbitrary. In addition, based on an element ID in the multiple BSSID element, the station may also identify that the element is the multiple BSSID element. Therefore, the multiple BSSID element may also be placed before the MLD element.

In addition, optionally, the management frame sent by the reporting AP further needs to carry a link identifier of the reporting AP, for example, a common information field carried in an EHT operation element, or carried in the MLD element, for example, a common information field carried in the MLD element shown in FIG. 6a or FIG. 6b.

Optionally, the information about all APs (including the reporting AP and the reported AP) further includes but is not limited to one or more of capability information of the AP, operation information of the AP, a link identifier of the AP, and the like. Optionally, the information about the AP may further include a MAC address (BSSID) of the AP, including some other fields or elements carried in a beacon in the current 802.11 protocol (for example, the 802.11-2016 protocol), for example, a timestamp field, a beacon interval field, and an SSID element, a BSS load element. The capability information of the AP includes an HT capability element, a VHT capability element, an HE capability element, and an EHT capability element. The operation information of the AP includes an HT operation element, a VHT operation element, an HE operation element, and an EHT operation element. If an AP is a 6 GHz AP, capability elements of the AP do not include an HT capability element or a VHT capability element, but include an HE capability element and an EHT capability element. Operation elements of the AP do not include an HT operation element or a VHT operation element, but include an HE operation element and an EHT operation element.

The information about the reporting AP is carried in the management frame sent by the AP, for example, the beacon frame or the probe response frame. Information about an AP that shares a device with the reporting AP is carried in an MLD element or a multiple BSSID element in the management frame sent by the AP. Device sharing means that the AP and the reporting AP are in one multi-AP multi-link device. Certainly, the first signaling structure of the MLD information provided in this embodiment of this application may be further applicable to another multi-AP multi-link device structure. FIG. 8a is merely an example. For example, the signaling information provided in this embodiment of this application may be further applicable to a multi-AP multi-link device structure in Solution 2, for example, a multi-AP multi-link device structure shown in FIG. 8b. In addition, in FIG. 8a and FIG. 8b, only three links are used as an example for description. The signaling information provided in this embodiment of this application may be further applicable to a structure of a multi-AP multi-link device with more links.

In another possible implementation, the MLD information may further include only one MLD element. Optionally, if the reporting AP belongs to a first multiple BSSID set, the MLD information further includes a multiple BSSID element that carries information about another AP in the first multiple BSSID set. If the another AP further belongs to one second MLD, the multiple BSSID element further includes information about another AP in the second MLD. This MLD element carries another AP in the multi-AP multi-link device except the reported AP carried in the multiple BSSID element. In other words, in the multi-AP multi-link device in which the reporting AP is located, all other reported APs that are not indicated in the multiple BSSID element are carried in one MLD element, where the MLD element carries a plurality of subelements, and one subelement carries information about one of the other reported APs. Specifically, the common information field in the MLD element carries one or more combinations of MLD identifiers and MLD addresses. A quantity of combinations is indicated in a common control field. In addition, in addition to the link identifier of the reporting AP and information about an AP, a subelement indicating each reported AP further needs to carry an MLD identifier of an MLD in which the AP is located. Optionally, an identifier of an MLD in which the reported AP is located is the same as an MLD identifier corresponding to the reported AP in an RNR. For details about that the RNR carries the MLD identifier of the MLD in which the reported AP is located, refer to the last embodiment. Optionally, when the reported AP is a single-link AP, an MLD address corresponding to the reported AP in a common field is a MAC address (BSSID) of the single-link AP. In this implementation, there is no virtual MLD element, a special MLD element, or the like.

Example 4: The AP 1x in the AP MLD 1 shown in FIG. 8a sends a management frame, for example, a beacon frame or a probe response frame. A sending manner may be broadcast or unicast. The management frame carries MLD information. The MLD information includes one MLD element. A common information field of the MLD element includes three combinations of MLD identifiers and MLD addresses, which are respectively: a combination 1 of an identifier of the MLD 1 and an address of the MLD 1, a combination 2 of an identifier of the MLD 2 and an address of the MLD 2, and a combination 3 of an identifier of the AP 3z and an address of the AP 3z. In addition, the MLD element carries five subelements, which respectively carry information about the AP 2y, AP 3x, AP 2x, AP 3y and the AP 3z. Because the reporting AP 1x belongs to a multiple BSSID set, the MLD information of the management frame further needs to carry a multiple BSSID element. The element carries a non-transmitted BSSID profile, and the non-transmitted BSSID profile is information about the AP 1y. In addition, because the AP 1y belongs to the AP MLD 3, the non-transmitted BSSID profile further additionally carries an MLD element. A common information field of the MLD element includes an address of the AP MLD 3 and carries one subelement, and the subelement carries information about the AP 2z. Correspondingly, the station that receives the management frame may learn, based on one MLD element and one multiple BSSID element that are carried in the MLD information, information about each AP in the multi-AP multi-link device and a relationship between the APs. For example, the station may learn, based on the combination in the MLD element and the MLD identifier in the subelement, that the AP 1x, the AP 2y, and the AP 3x all belong to the MLD 1, the AP 2x and the AP 3y all belong to the MLD 2, and the AP 3z in the third MLD element is a single-link device. The station may learn, based on the multiple BSSID element, that the AP 1y and the AP 1x belong to one multiple BSSID set, and the station may learn, based on an MLD element included in the multiple BSSID element, that the AP 1y and the AP 2z both belong to the MLD 3.

The following describes the structure of the multi-AP multi-link device in Solution 2.

Solution 2:

Transmitted BSSID APs in a plurality of multiple BSSID sets belong to a same AP multi-link device. In other words, if one or more APs in the AP multi-link device belong to a multiple BSSID set, all the transmitted BSSID APs in the multiple BSSID set belong to one AP multi-link device. For example, a transmitted BSSID AP 1 in a multiple BSSID set 1 and a transmitted BSSID AP 2 in a multiple BSSID set 2 belong to two different APs in an AP multi-link device MLD 1. In this case, a multiple BSSID network constructed based on the AP multi-link device is simpler, and signaling MLD information overheads are less.

Based on the structure of the multi-AP multi-link device in Solution 2, this embodiment of this application provides a second signaling structure of MLD information.

In the second signaling structure of the MLD information, the MLD information includes one MLD element. Optionally, if a reporting AP belongs to a first multiple BSSID set, the MLD information further includes a multiple BSSID element. Optionally, the multiple BSSID element includes information about one or more or all other APs (non-transmitted BSSID APs) in the first multiple BSSID set to which the reporting AP belongs. The MLD element includes information about one or more other APs in a first MLD to which the reporting AP belongs, that is, the MLD element includes subelements, and one subelement carries information about another AP in the first MLD. For another AP in the first MLD, the another AP in the first MLD is also a transmitted AP for the structure in Solution 2. If another AP in the first MLD further belongs to one second multiple BSSID set, a subelement of the another AP in the first MLD further includes a multiple BSSID element, to indicate information about another AP (non-transmitted BSSID AP) in the second multiple BSSID set.

In the second signaling structure of the MLD information, the MLD information also includes the MLD element, and optionally further includes the multiple BSSID element. Compared with the first signaling structure of the MLD information, the second signaling structure of the MLD information may not include various types of MLD elements, and types are not distinguished. The MLD element includes a common control field and an MLD common information field, and optionally includes one or more subelements. One subelement indicates information about a reported AP. For example, a structure of an MLD element in the second signaling structure of the MLD information is shown in FIG. 6c, and a signaling structure of one subelement is shown in FIG. 7.

Figure 10B:
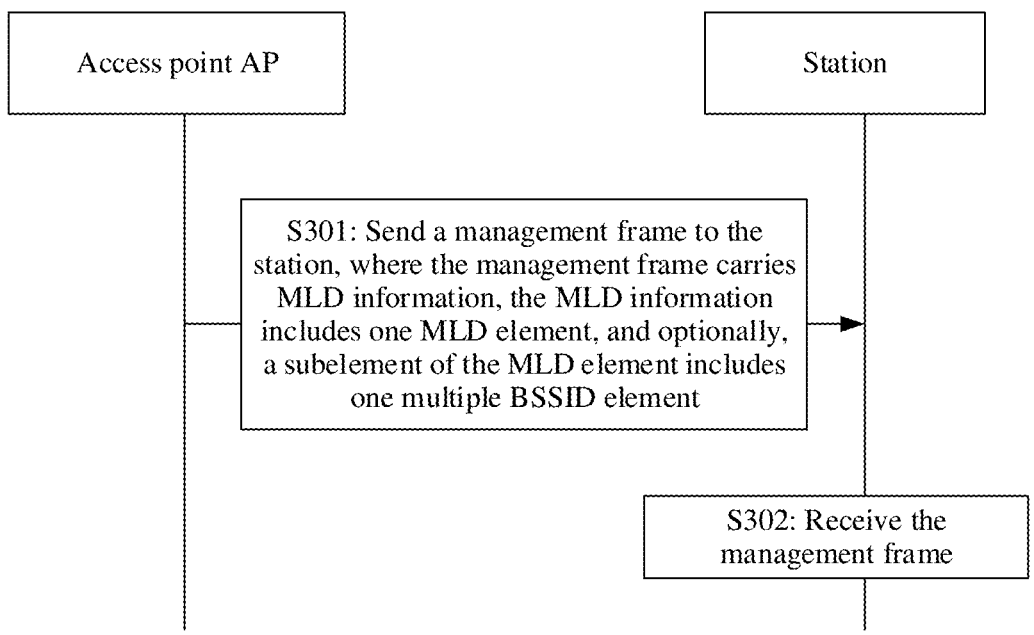
FIG. 10b is a schematic flowchart of another signaling information exchange method for a multi-AP multi-link device according to an embodiment of this application.

According to the foregoing second signaling structure, this embodiment of this application provides another signaling information exchange method for the multi-AP multi-link device. For example, as shown in FIG. 10b, the method includes the following steps.

Step S301: An access point sends a management frame to a station. The management frame carries MLD information. The MLD information includes an MLD element. Optionally, a subelement of the MLD element includes a multiple BSSID element.

The access point belongs to an access point MLD. For example, the access point is an AP in an AP multi-link device, and the access point is referred to as the reporting AP. The station that receives the management frame may be a station in a multi-link station device, or may be a single-link station.

The management frame is, for example, a beacon frame, an association response frame, a probe response frame, an authentication frame, or a neighbor report. The MLD information carries information about another AP (referred to as a reported AP) that shares a device (a multi-AP multi-link device in which the reporting AP is located) with the reporting AP. The reported AP is as follows:

1. The reported AP includes another AP belonging to a same AP MLD as the reporting AP.

2. If the another AP belonging to the same AP MLD as the reporting AP belongs to a multiple BSSID set, the reported AP further includes an AP in the multiple BSSID set.

3. If the reporting AP belongs to the multiple BSSID set, the reported AP further includes another AP belonging to the same multiple BSSID set as the reporting AP.

The MLD information may use an MLD element. If the reported AP described by the subelement in the MLD element belongs to the multiple BSSID set, the subelement further includes the multiple BSSID element, to indicate information about the another AP (non-transmitted BSSID AP) in the same multiple BSSID set in which the reported AP is located. For a signaling design and structure in the MLD element, refer to the descriptions in the foregoing paragraphs. For a signaling design and structure in the multiple BSSID element, refer to descriptions in the foregoing paragraphs.

In addition, the management frame sent by the reporting AP further carries information about the reporting AP. For example, currently an 802.11 beacon frame carries the information about the reporting AP.

It should be noted that the MLD information may also be referred to as MLD multiple BSSID information and the like. Certainly, the MLD information may have another name. This is not specifically limited in this embodiment of this application.

Step S302: The station receives the management frame sent by the access point.

Specifically, the station parses the management frame sent by the reporting AP to obtain the MLD information about the reporting AP. The MLD information includes one MLD element. Optionally, a subelement of the MLD element includes a multiple BSSID element. Specifically, if the reporting AP belongs to the multiple BSSID set, the MLD information further includes a multiple BSSID element. The multiple BSSID element includes information about another AP belonging to the same multiple BSSID set as the reporting AP. If an AP belonging to a same MLD as the reporting AP further belongs to a transmitted AP in a second multiple BSSID set, a subelement of the transmitted AP in the MLD element further includes a multiple BSSID element, and carries information about a non-transmitted AP in the second multiple BSSID set.

It may be understood that, optionally the method further includes step S303: The station may learn, based on content parsed from the MLD information, a structure of the multiple BSSID set based on the AP multi-link device and information about each reported AP.

The station receives the management frame of the AP, and learns, based on the management frame, information about the reporting AP and information about the another AP that shares the device with the reporting AP. In this way, the station may select a corresponding AP or AP multi-link device to establish an association.

Figure 8B:
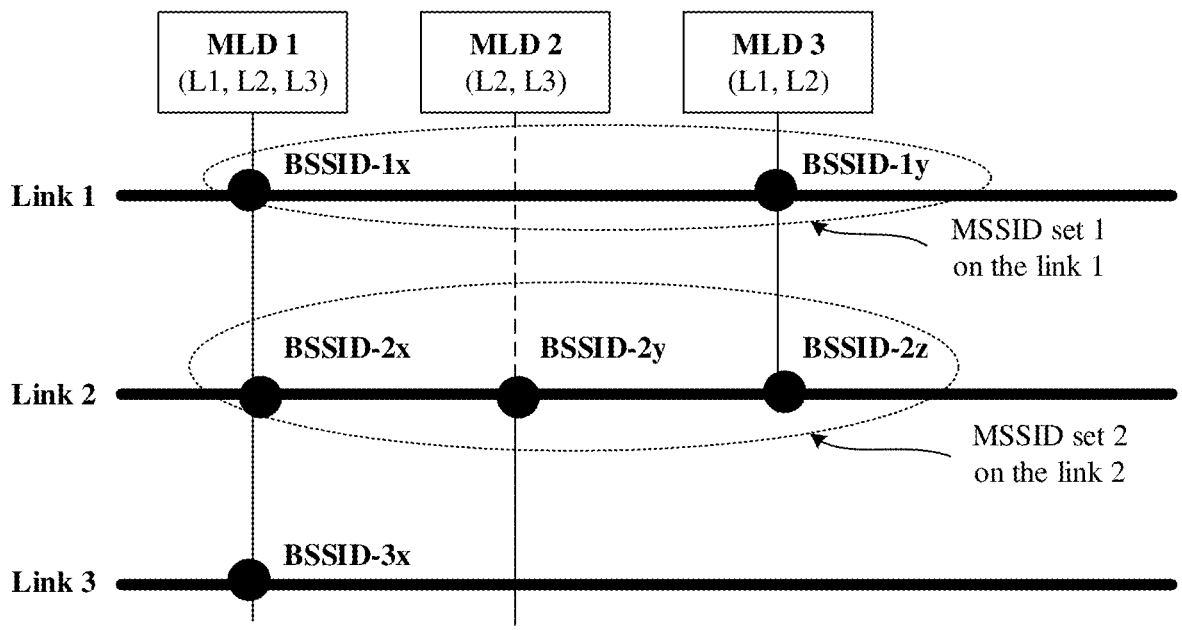
FIG. 8b is a schematic diagram of a structure of still another multi-AP multi-link device according to an embodiment of this application.

The following describes an architecture of a multi-AP multi-link device in Solution 2. FIG. 8b is a schematic diagram of a structure of the multi-AP multi-link device in Solution 2. An AP whose MAC address identifier ends with x is a transmitted BSSID AP, and an AP whose MAC address identifier ends with y or z is a non-transmitted BSSID AP. For example, a transmitted BSSID AP in a multiple BSSID set 1 is an AP 1x whose MAC address identifier is BSSID-1x, and a non-transmitted BSSID AP in the multiple BSSID set 1 is an AP 1y whose MAC address identifier is BSSID-1y. A transmitted BSSID AP in a multiple BSSID set 2 is an AP 2x whose MAC address identifier is BSSID-2x, and non-transmitted BSSID APs in the multiple BSSID set 2 include an AP 2y whose MAC address identifier is BSSID-2y and an AP 2z whose MAC address identifier is BSSID-2z. A transmitted BSSID AP in a multiple BSSID set 3 is an AP 3x whose MAC address identifier is BSSID-3x. It can be seen from FIG. 8b that transmitted BSSID APs (namely, transmitted APs) from different multiple BSSID sets are all in an AP multi-link device MLD 1.

For ease of understanding, in this embodiment of this application, FIG. 8b is used as an example to describe signaling structures of MLD information in several cases.

Figure 9D:
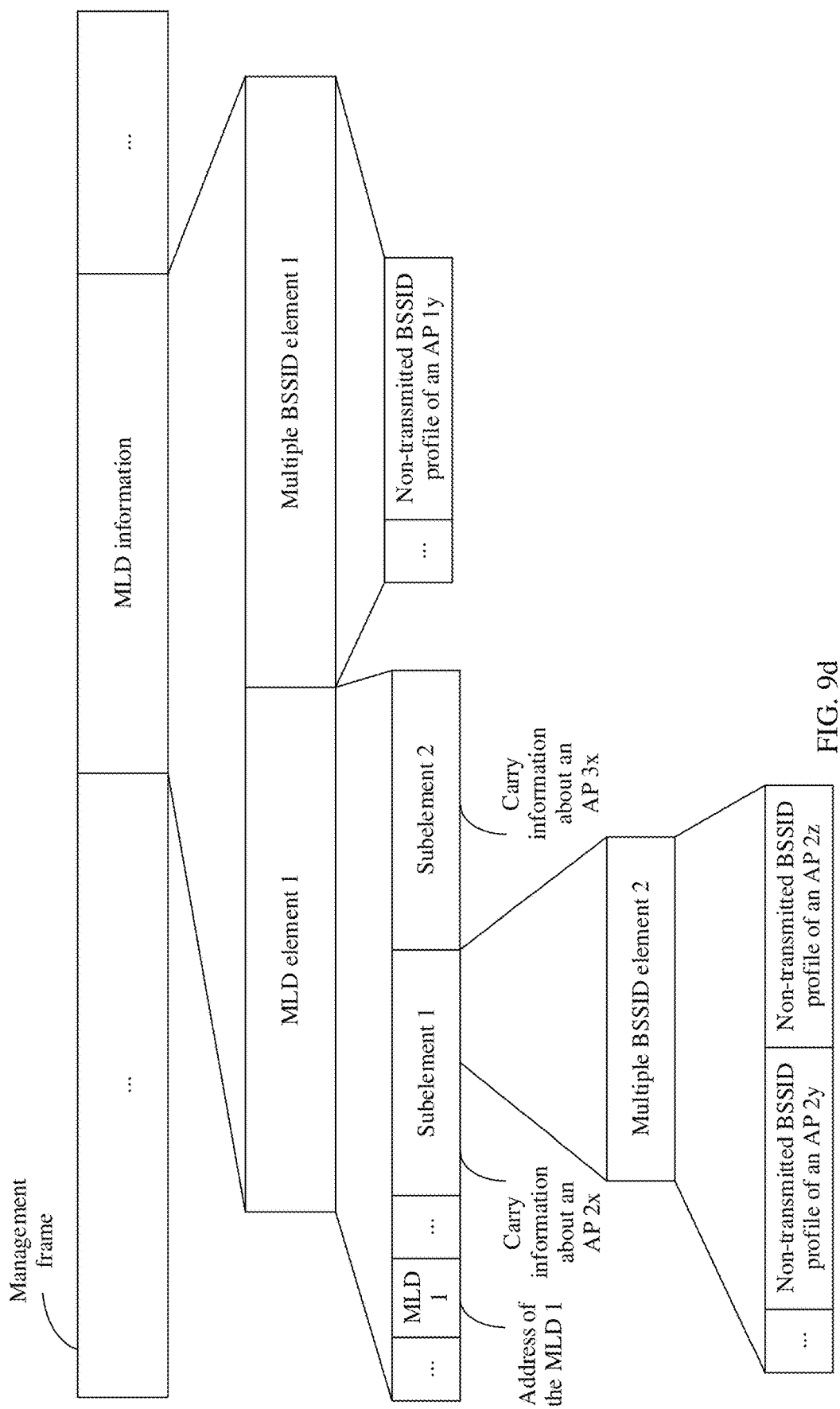
FIG. 9d is a schematic diagram of a structure of yet another management frame according to an embodiment of this application.

Example 1: The AP 1x in the AP MLD 1 shown in FIG. 8b sends a management frame, for example, a beacon frame or a probe response frame. A sending manner may be broadcast or unicast. For example, as shown in FIG. 9d, the management frame carries an MLD element. An MLD common information field includes an address of the AP MLD 1, two subelements are carried, a first subelement carries information about the AP 2x, and a second subelement carries information about the AP 3x. Because the AP 2x carried in the first subelement belongs to the multiple BSSID set, the subelement needs to additionally carry one multiple BSSID element 2. The element carries two non-transmitted BSSID profiles, which respectively describe information about the AP 2y and the AP 2z. Because the reporting AP 1x belongs to the multiple BSSID set, the MLD information of the management frame further needs to carry a multiple BSSID element 1. The element carries a non-transmitted BSSID profile, and the non-transmitted BSSID profile is information about the AP 1y. Correspondingly, the station that receives the management frame may learn, based on the MLD information, information about each AP in the multi-AP multi-link device and a relationship between the APs. For example, the station may learn, based on the MLD element, that the AP 1x, the AP 2x, and the AP 3x all belong to the MLD 1. The station may learn, based on the multiple BSSID element 2 in the first subelement, that the AP 2x, the AP 2y, and the AP 2z all belong to the multiple BSSID set 2. The station may learn, based on the multiple BSSID element 1, that the AP 1x and the AP 1y both belong to the multiple BSSID set 1.

It should be noted that a location of the MLD element and a location of the multiple BSSID element are merely examples, and are not limited to the order shown in FIG. 9d in embodiments of this application. It may be understood that, because each MLD element includes a type identifier, the station may determine the type of the MLD element based on the type identifier. Therefore, locations of a plurality of MLD elements may also be arbitrary. In addition, based on an element ID in the multiple BSSID element, the station may also identify that the element is the multiple BSSID element. Therefore, the multiple BSSID element may also be placed before the MLD element.

In this embodiment, for the flexible structure of the multi-AP multi-link device, the signaling structure of the MLD information indicating the flexible structure of the multi-AP multi-link device is designed. The MLD information describes, information about one or more APs in the multi-AP multi-link device by using one or more MLD elements and the MLD element included in the multiple BSSID element. The signaling structure of the MLD information is simple and flexible, information about the AP included in the structure of the multi-AP multi-link device can be flexibly and completely indicated. Further, the access point indicates, to the station based on the MLD information, the multiple BSSID set structure based on the AP multi-link device. The station may obtain, based on the MLD information, information about each AP in the multi-AP multi-link device, to help the station select the appropriate AP or AP MLD for association. This improves flexibility of selecting the AP by the station for association.

Embodiment 3

An embodiment of this application provides still another signaling information exchange method (including a sending method and a receiving method) for a multi-AP multi-link device. In this embodiment, to prevent a reporting AP from broadcasting information about one or more or all APs in a multi-AP multi-link device in which the reporting AP is located, an RNR element, an MLD element, and a multiple BSSID element are jointly used. This reduces signaling overheads. In addition, to avoid repeated parameters such as an operating class, a channel number, and a BSSID of an AP in subsequent multi-link operation, a link identifier of the AP is added to the RNR element and the multiple BSSID element. There is a correspondence between the link identifier of the AP and the parameters such as the operating class, the channel number, and the BSSID of the AP. In subsequent transmission or communication, the parameters such as the operating class, the channel number, and the BSSID of the AP do not need to be carried. This reduces signaling overheads. In addition, because an operating class and a channel number of a non-transmitted BSSID in the multiple BSSID element are the same as an operating class and a channel number of a transmitted BSSID in the multiple BSSID element, the two parameters, namely the operating class and the channel number do not appear in a non-transmitted BSSID profile of the multiple BSSID element. This further reduces signaling overheads.

Figure 11:
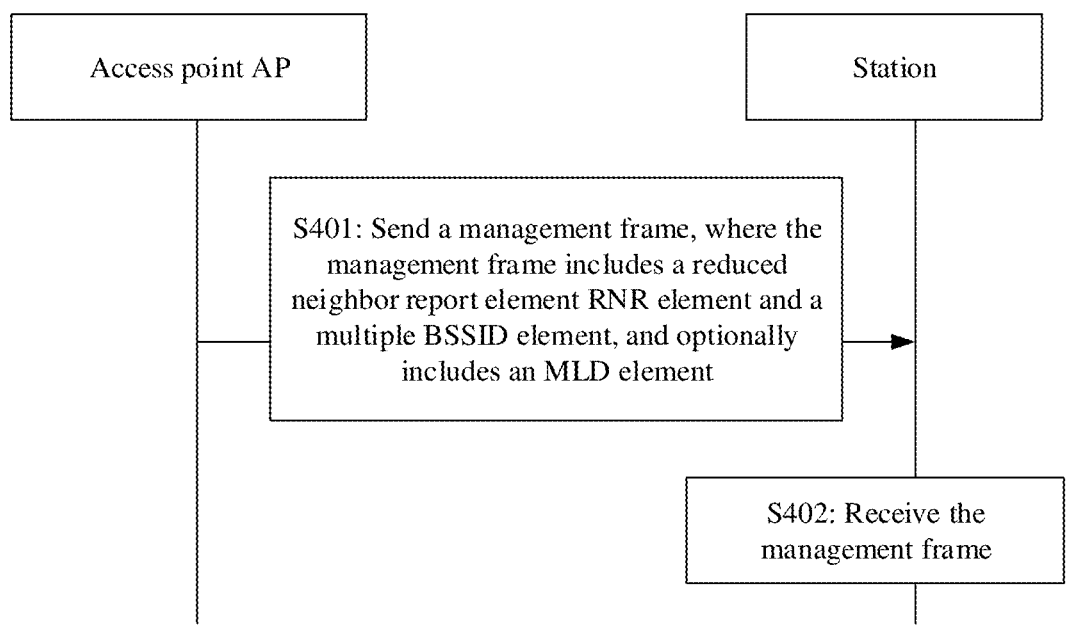
FIG. 11 is a schematic flowchart of a signaling information exchange method for a multi-AP multi-link device according to an embodiment of this application.

This embodiment of this application provides still another information exchange method for a multi-AP multi-link device. As shown in FIG. 11, the method further includes the following steps.

Step S401: An access point sends a management frame. The management frame includes a reduced neighbor report element RNR element and a multiple BSSID element, and optionally includes an MLD element.

The access point belongs to an access point MLD. For example, the access point is an AP in an AP multi-link device, the management frame is sent by the access point, and the access point is referred to as the reporting AP. The station that receives the management frame may be a station in a multi-link station device, or may be a single-link station. The reporting AP belongs to a multiple BSSID set, the reporting AP is a transmitted AP in the multiple BSSID set, and the multiple BSSID set further includes a non-transmitted AP. Therefore, the management frame includes the multiple BSSID element. The multiple BSSID element includes a non-transmitted BSSID profile of the non-transmitted AP, to indicate the non-transmitted AP.

Optionally, the management frame is a beacon frame, an association response frame, a probe response frame, an authentication frame, or a neighbor report.

The RNR element, the MLD element, and the multiple BSSID element carry information about another AP (referred to as a reported AP) that shares a device with the reporting AP.

Step S402: The station receives the management frame sent by the access point.

Specifically, the station parses the management frame sent by the reporting AP to obtain the RNR element and the multiple BSSID element, and optionally obtain the MLD element, so as to obtain a multiple BSSID set structure based on the AP multi-link device.

Optionally, the method further includes step S403: Determine, based on the management frame, the multiple BSSID set structure based on the AP multi-link device and information about each AP. Further, the station may further select, based on the structure and the information about each AP, an appropriate AP or AP MLD for association.

Based on this solution, the station may obtain, based on the management frame, information about the reporting AP and the information about the another AP that shares the device with the reporting AP. In this way, the station may select an appropriate AP or AP multi-link device to establish an association.

The RNR element, the MLD element, and the multiple BSSID element carry the information about the another AP (referred to as the reported AP) that shares the device with the reporting AP.

The reported AP is as follows:

1. The reported AP includes another AP belonging to a same AP MLD as the reporting AP.

2. If the another AP belonging to the same AP MLD as the reporting AP belongs to a multiple BSSID set, the reported AP further includes an AP in the multiple BSSID set.

3. If the reporting AP belongs to the multiple BSSID set, the reported AP further includes another AP belonging to the same multiple BSSID set as the reporting AP.

In addition, the management frame sent by the reporting AP further carries the information about the reporting AP. For example, currently an 802.11 beacon frame carries the information about the reporting AP.

In addition, to avoid repeated parameters such as the operating class, the channel number, and the BSSID of the AP in subsequent multi-link operation, in this embodiment of this application, the link identifier of the AP is added to the RNR element and the multiple BSSID element, so that the parameters such as the operating class, the channel number, and the BSSID of the AP are in a one-to-one correspondence.

The following describes in detail how to indicate, with reference to the RNR element, the MLD element, and the multiple BSSID element, the foregoing multiple BSSID set structure based on the AP multi-link device, information about APs in the structure, and a relationship between the APs.

Part 1: RNR Element

First, the RNR element includes simplified information about another AP that belongs to a same MLD as the reporting AP, and information about another AP that belongs to a same multiple BSSID set as the another AP. Optionally, simplified information about a non-transmitted AP that belongs to a same multiple BSSID set as the reporting AP is not carried. For example, the multiple BSSID set structure of the AP multi-link device shown in FIG. 8*a* is used as an example. The RNR element sent by the reporting AP carries simplified information about the AP 2y, the AP 3x, the AP 2x, the AP 3y, the AP 3z, and the AP 2z, and does not carry simplified information about the AP 1y. Because both the AP 1x and the AP 1y belong to one multiple BSSID, the AP 1y is a non-transmitted BSSID AP and is carried in a multiple BSSID element sent by the AP 1x. The AP 1x serves as the reporting AP, and information about the AP 1x is carried in the management frame. In this case, simplified information about a non-transmitted BSSID AP in a multiple BSSID set in which the reporting AP is located does not need to be carried in the RNR element. This reduces signaling overheads caused by carrying repeated signaling.

Second, to avoid repeated occurring of parameter information of each AP, such as an operating class, a channel number, and a BSSID, in another multi-link operation interaction process, the RNR element may further carry a link identifier of each reported AP, and indicate a correspondence between the link identifier of the reported AP and three parameters such as an operating class, a channel number and a BSSID of the reported AP.

In addition, optionally the RNR element further carries information indicating a relationship between the reported AP and the reporting AP.

For example, the RNR element may further include signaling information indicating one or more of the following three relationships:

1. whether the reported AP and the reporting AP are from the same MLD;
2. whether the reported AP and any other AP in the MLD in which the reporting AP is located are from a same multiple BSSID; and
3. whether the reported AP and the reporting AP are in the same MLD or whether the reported AP belongs to the same multiple BSSID set as a member of the MLD to which the reporting AP belongs.

Figure 14A:
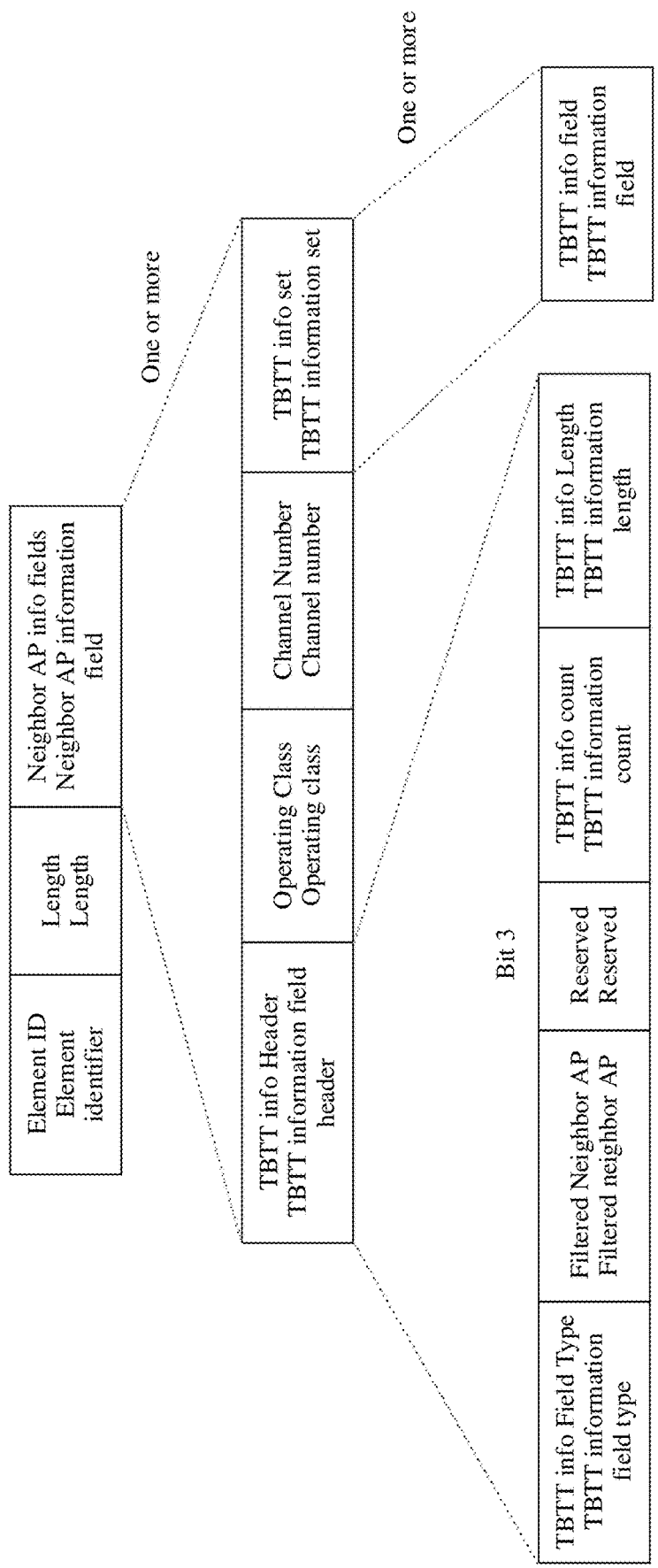
FIG. 14a is a schematic diagram of a structure of a reduced neighbor report RNR element according to an embodiment of this application.

For example, the foregoing three relationships are separately indicated by using 1 bit. In an example, information is carried in a BSS parameter field in a TBTT information field in the RNR element, to indicate the foregoing one or more relationships. For example, a co-MLD field is carried in the BSS parameter field. The co-MLD field indicates whether the reported AP and the reporting AP are in a same MLD or whether the reported AP and a member AP of the MLD to which the reporting AP belongs belong to the same multiple BSSID set. For another example, a co-MLD multiple BSSID field is carried in the BSS parameter field to indicate whether the reported AP and any other AP of the MLD in which the reporting AP is located are from the same multiple BSSID. For example, a co-MLD bit in FIG. 14c is used to indicate the third relationship. A specific form thereof is not limited in the present invention.

In another example, the RNR element may indicate one or more of the following two types:

Signaling 1: whether a plurality of reported APs are from the same MLD; and
Signaling 2: whether a plurality of reported APs are from the same multiple BSSID set.

The signaling 1 may be implemented by adding an MLD identifier to information about the reported AP. If MLD identifiers of the plurality of reported APs are the same, it indicates that the plurality of reported APs are from the same MLD. The signaling 2 may be implemented by adding a multiple BSSID set identifier to the information about the reported AP. If multiple BSSID set identifiers of the plurality of reported APs are the same, it indicates that the plurality of reported APs are from the same multiple BSSID set. Optionally, if the MLD identifier carried in the information about the reported AP is a special value, for example, 0, it indicates that the reported AP and the reporting AP belong to the same MLD. Optionally, if the multiple BSSID set carried in the information about the reported AP is set to a special value, it indicates that the reported AP and the reporting AP belong to the same multiple BSSID set.

Based on the foregoing signaling, the RNR may indicate a relationship between the reported AP and the reporting AP and a relationship between the plurality of reported APs, so that the station may obtain the relationship between the reported AP and the reporting AP and the relationship between the plurality of reported APs based on the foregoing signaling in the RNR element.

In addition, because the information about the reported AP further includes a link identifier, the relationship between the APs may be determined based on the link identifier and a relationship between the link identifier and the MLD identifier and/or the multiple BSSID set identifier. For example, FIG. 8a is used as an example. The link ID of the reported AP 2y is 2, and the MLD identifier is 1. The link ID of the reported AP 3x is 4, and the MLD identifier is 1. It can be learned that the AP 2y and the AP 3x have a same MLD identifier and belong to the same MLD. It can be further learned that the AP whose link ID is 2 and the AP whose link ID is 4 belong to the same MLD. Therefore, because the link identifier of the reported AP is unique, the relationship between the reported AP and the reporting AP and the relationship between the plurality of reported APs do not need to be additionally indicated in the MLD element. This avoids repeated signaling indicators.

In another implementation, the signaling (for example, signaling 1 and signaling 2) indicating the relationship between the APs may not be carried in the RNR element, but may be carried in the MLD element. The signaling is carried in a subelement of each MLD element.

Part 2: MLD Element

For a type of the MLD element sent by the reporting AP and a structure of the sent MLD element, reference may be made to the description in Embodiment 2. Details are not described herein again.

Part 3: Multiple BSSID Element

If the reporting AP belongs to one multiple BSSID set, the management frame further includes a multiple BSSID element. The multiple BSSID element includes information about one or more non-transmitted APs in the multiple BSSID set to which the reporting AP belongs, and is referred to as a non-transmitted BSSID profile. The non-transmitted BSSID profile carries information about the non-transmitted AP, and further includes a link ID of the non-transmitted AP. This avoids high signaling overheads and signaling redundancy caused by carrying a plurality of pieces of parameter information, such as an operating class, a channel number, and a BSSID.

Figure 12:
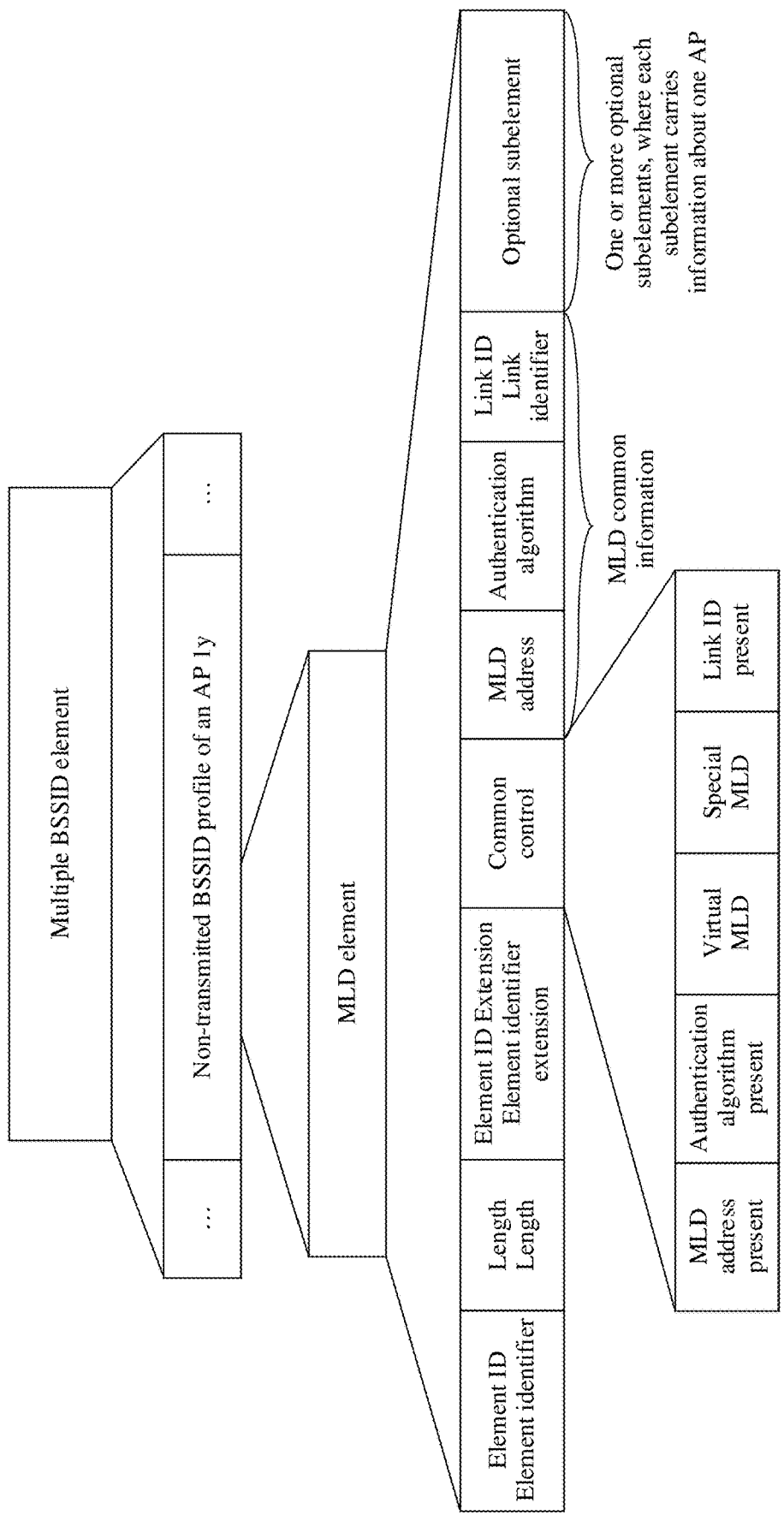
FIG. 12 is a schematic diagram of a structure of a multiple BSSID element according to an embodiment of this application.

Manners of carrying the link identifier in the multiple BSSID element include but are not limited to the following two manners:

In a first manner, if the non-transmitted AP indicated by the non-transmitted BSSID profile in the multiple BSSID elements further belongs to one MLD, and the non-transmitted BSSID profile of the non-transmitted AP further includes one MLD element, a subelement in the MLD element indicates information about another AP of the MLD to which the non-transmitted AP belongs. In this case, the link identifier of the non-transmitted AP may be carried in the MLD element, for example, carried in a common information field of the MLD element. Optionally, the common control field of the MLD element further includes a link identifier (link ID) present field, to indicate whether a link ID field is present or exists. Optionally, a structure of the multiple BSSID element is shown in FIG. 12. In another example, the virtual MLD field and the special MLD field in FIG. 12 may be replaced with an MLD type indicator as a second structure of the multiple BSSID element.

In a second manner, the link identifier of the non-transmitted AP may be carried in the non-transmitted BSSID profile of the non-transmitted AP, but is not carried in the MLD element. For the second implementation, the non-transmitted BSSID profile may include an MLD element, or may not include the MLD element.

Because the simplified information about the non-transmitted AP is not carried in the RNR element, to determine a relationship between the non-transmitted AP and another reported AP, this embodiment of this application provides the following two implementations:

Manner 1: If the non-transmitted AP belongs to one MLD, one MLD element may be carried in the non-transmitted BSSID profile. The MLD element includes a subelement, to indicate information about another AP in the MLD to which the non-transmitted AP belongs, so as to indicate that the non-transmitted AP and a reported AP belong to the same MLD. For example, as shown in FIG. 8a, the AP 1x sends the management frame. The AP 1x and the AP 1y both belong to a multiple BSS set 1. The RNR element may not carry the information about the AP 1y. The multiple BSSID element in the management frame carries a non-transmitted BSSID profile of the AP 1y. The non-transmitted BSSID profile further carries one MLD element. A subelement in the MLD element carries the information about the AP 2z. The station that receives the management frame may determine, based on the RNR element and the multiple BSSID element, a relationship between the AP 1y and another AP: The AP 1y and the AP 1x belong to the multiple BSS set 1, and the AP 1y and the AP 2z belong to the MLD 3.

Manner 2: The non-transmitted BSSID profile does not carry an MLD element. The non-transmitted BSSID profile needs to carry an MLD identifier, which is used together with an MLD identifier in the information about the reported AP in the RNR, to indicate whether the non-transmitted BSSID AP and the reported AP carried in the RNR are from a same MLD. For example, as shown in FIG. 8a, the AP 1x sends the management frame. The AP 1x and the AP 1y both belong to a multiple BSS set 1. The RNR element may not carry the information about the AP 1y. The information about the reported AP in the RNR element carries an MLD identifier, that is, the information about the AP 2z carries the identifier of the MLD 3. The multiple BSSID element in the management frame carries a non-transmitted BSSID profile of the AP 1y and an identifier of an MLD to which the AP 1y belongs. The station that receives the management frame may determine, based on the MLD identifier carried in the information about the AP 2z in the RNR element and the MLD identifier of the AP 1y carried in the multiple BSSID element, a relationship between the AP 1y and another AP: The AP 1y and the AP 1x belong to the multiple BSSID set 1, and the AP 1y and AP 2z belong to the MLD 3.

The following uses FIG. 8a as an example to describe a signaling structure of the management frame. The AP 1x in the AP MLD 1 sends the management frame, for example, a beacon frame, in a broadcast manner. As shown in FIG. 13a, the management frame includes one RNR element. The RNR element carries simplified information about the AP 2y, the AP 3x, the AP 2x, the AP 3y, and the AP 3z. The simplified information includes a one-to-one correspondence between the link identifier of the AP and the parameters such as the operating class, the channel number, and the BSSID of the AP. The management frame further carries three MLD elements. A first MLD element is a formal MLD element, a common information field includes an address of the AP MLD 1, two subelements are carried, a first subelement carries information about the AP 2y, and a second subelement carries information about the AP 3x. A second MLD element is a virtual MLD element, a common information field includes an address of the AP MLD 2, two subelements are carried, a first subelement carries information about the AP 2x, and a second subelement carries information about the AP 3y. A third MLD element is a special MLD element, a common information field does not exist, one subelement is carried, and the subelement carries information about the AP 3z. Link identifiers included in the information about the AP 2y, the AP 3x, the AP 2x, and the AP 3z carried in the three MLD elements are the same as link identifiers of these APs in the RNR element. Therefore, the MLD element does not repeatedly carry one or more of the parameters such as the operating class, the channel number, and the BSSID, carried in the RNR. This avoids signaling redundancy and reduces signaling overheads. Because the reporting AP 1x belongs to a multiple BSSID set, the management frame further needs to carry a multiple BSSID element. The element carries a non-transmitted BSSID profile, and the non-transmitted BSSID profile is the information about the AP 1y. In addition, because the AP 1y belongs to the AP MLD 3, the non-transmitted BSSID profile further additionally carries a formal MLD element. A common information field includes an address of the AP MLD 3 and carries one subelement, and the subelement carries the information about the AP 2z. The link identifier included in the information about the AP 2z is the same as the link identifier of the AP 2z in the RNR element. Optionally, the simplified information about the AP 1y may not appear in the RNR element. The parameters such as the operating class and the channel number in the simplified information about the AP 1y are the same as those of the reporting AP 1x. The information about the BSSID of the AP 1y may be carried in the non-transmitted BSSID profile of the AP 1y. Correspondingly, the station may learn the information about the AP 1x, the AP 1y, the AP 2y, the AP 3x, the AP 2x, the AP 3y, and the AP 3z, and may further determine the relationship between the APs based on the RNR element, the three MLD elements, and the multiple BSSID element in the management frame. Specifically, the station may determine, based on matching of link IDs carried in the RNR element and the MLD element, simplified information about the reported AP carried in the RNR and other information about the reported AP carried in the MLD element. As shown in FIG. 13a, the link ID of the AP 2y carried in the information about the AP 2y in the RNR is 2, and the link ID carried in the first subelement of the first MLD element is also 2. The station may determine simplified information about the AP 2y in the RNR based on matching of the link IDs, and may determine other information about the AP 2y based on the first subelement of the first MLD element. Further, the station may further determine that: the AP 1x and the AP 1y belong to the multiple BSSID set 1, the AP 1x, the AP 2y, and the AP 3x belong to the MLD 1, the AP 2x and the AP 3y belong to the MLD 2, the AP 3z is a single-link device, the AP 2y, the AP 2x, and the AP 2z belong to the multiple BSSID set 2, and the AP 3x, the AP 3y, and the AP 3z belong to a multiple BSSID set 3.

The following uses FIG. 8a as an example to describe another signaling structure of the management frame. The AP 1x in the AP MLD 1 sends the management frame, for example, a beacon frame, in a broadcast manner. As shown in FIG. 13b, the management frame includes one RNR element. The RNR element carries simplified information about the AP 2y, the AP 3x, the AP 2x, the AP 3y, and the AP 3z. The simplified information includes a one-to-one correspondence between the link identifier of the AP and the parameters such as the operating class, the channel number, and the BSSID of the AP. The information about each AP in the RNR element further includes the MLD identifier and/or the multiple BSSID set identifier. Optionally, the management frame further carries three MLD elements. A first MLD element is a formal MLD element, a common information field includes an address of the AP MLD 1, two subelements are carried, a first subelement carries information about the AP 2y, and a second subelement carries information about the AP 3x. A second MLD element is a virtual MLD element, a common information field includes an address of the AP MLD 2, two subelements are carried, a first subelement carries information about the AP 2x, and a second subelement carries information about the AP 3y. A third MLD element is a special MLD element, a common information field does not exist, one subelement is carried, and the subelement carries information about the AP 3z. Link identifiers included in the information about the AP 2y, the AP 3x, the AP 2x, and the AP 3z carried in the three MLD elements are the same as link identifiers of these APs in the RNR element. Therefore, the MLD element does not repeatedly carry one or more of the parameters such as the operating class, the channel number, and the BSSID, carried in the RNR. This avoids signaling redundancy and reduces signaling overheads. Because the reporting AP 1x belongs to a multiple BSSID set, the management frame further needs to carry a multiple BSSID element. The element carries a non-transmitted BSSID profile, and the non-transmitted BSSID profile is the information about the AP 1y, and includes a link identifier of the AP 1y. Optionally, the MLD identifier of the MLD to which the AP 1y belongs is further included. Optionally, the simplified information about the AP 1y may not appear in the RNR element. The parameters such as the operating class and the channel number in the simplified information about the AP 1y are the same as those of the reporting AP 1x. The information about the BSSID of the AP 1y may be carried in the non-transmitted BSSID profile of the AP 1y. Specifically, the parameter is calculated based on a reference BSSID (Transmitted BSSID) and a multiple BSSID-index element in the non-transmitted BSSID profile. For a calculation method, see Draft P802.11REVmd_D3.0. Correspondingly, based on the RNR element, the three MLD elements, and the multiple BSSID element in the management frame, the station may learn information about the AP 1x, the AP 1y, the AP 2y, the AP 3x, the AP 2x, the AP 3y, and the AP 3z, and may further determine a relationship between the APs. Specifically, the station may determine, based on matching of link IDs carried in the RNR element and the MLD element, simplified information about the reported AP carried in the RNR and other information about the reported AP carried in the MLD element. As shown in FIG. 13b, the link ID of the AP 2y carried in the information about the AP 2y in the RNR is 2, and the link ID carried in the first subelement of the first MLD element is also 2. The station may determine simplified information about the AP 2y in the RNR based on matching of the link IDs, and may determine other information about the AP 2y based on the first subelement of the first MLD element. Further, the station may determine that the AP 1x and the AP 1y belong to the multiple BSSID set 1. The station may determine, based on the MLD identifier, that the AP 1x, the AP 2y, and the AP 3x belong to the MLD 1, the AP 2x and the AP 3y belong to the MLD 2, and the AP 3z is a single-link device. It may be determined, based on the multiple BSSID set identifier, that the AP 2y, the AP 2x, and the AP 2z belong to the multiple BSSID set 2, and the AP 3x, the AP 3y, and the AP 3z belong to a multiple BSSID set 3.

The following describes an implementation of the RNR element.

Reduced neighbor report element: An AP carries the reduced neighbor report element in a management frame, for example, a beacon frame or a probe response frame. During scanning, a station receives the management frame sent by the AP, obtains information about surrounding APs based on the reduced neighbor report element in the management frame, and then selects an appropriate AP for association.

Specifically, the reduced neighbor report element generally carries one or more neighbor AP info fields, to describe information about one or more neighbor APs and BSSs to which the neighbor APs belong. The neighbor AP is also referred to as a reported AP, and an AP that sends the RNR element is referred to as a reporting AP below. The neighbor AP information field carries simplified information about the neighbor AP, that is, carries simplified information about the reported AP. FIG. 14a shows a schematic diagram of an RNR element. It can be seen from FIG. 14b that the neighbor AP information field of the simplified neighbor report element may include the following fields.

A TBTT info header (target beacon transmission time (TBTT) information header) field carries the following information:
- a TBTT info field type (TBTT information field type) field indicating a type of TBTT info (TBTT information) and indicating a format of a TBTT info field together with a TBTT info length (TBTT information length) field;
- a filtered neighbor AP field indicating whether SSIDs of all BSSs carried in the neighbor AP info (neighbor AP information) fields match an SSID in a probe request frame;
- a reserved field (1 bit);
- a TBTT info count field indicating a quantity of TBTT info fields included in a TBTT info set; and
- a TBTT info length (TBTT information length) field indicating a length of each TBTT info field. Table 4 shows formats of carried specific information of different lengths.

TABLE 4

| TBTT information length (byte) | Content carried in a TBTT information field |
| --- | --- |
| 1 | TBTT offset field of a neighbor AP |
| 2 | TBTT offset field and BSS parameter field of a neighbor AP |
| 5 | TBTT offset field and short SSID field of a neighbor AP |
| 6 | TBTT offset field, short SSID field, and BSS parameter field of a neighbor AP |
| 7 | TBTT offset field and BSSID field of a neighbor AP |
| 8 | TBTT offset field, BSSID field, and BSS parameter field of a neighbor AP |

TABLE 4-continued

| TBTT information length (byte) | Content carried in a TBTT information field |
|---|---|
| 11 | TBTT offset field, BSSID field, and short SSID field of a neighbor AP |
| 12 | TBTT offset field, BSSID field, short SSID field, and BSS parameter field of a neighbor AP |
| 0, 9-10 | Reserved |
| 13-255 | Reserved, but information about first 12 bytes is the same as the fields carried when the TBTT information length is 12. |

Figure 14B:
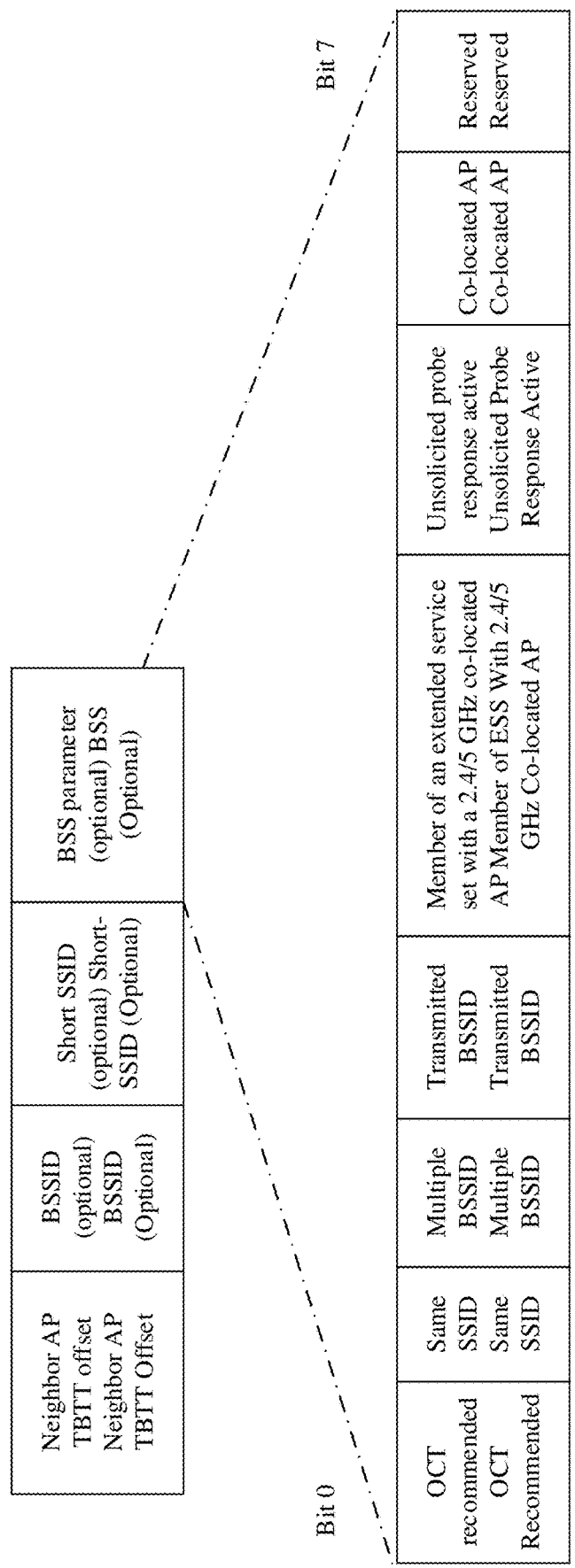
FIG. 14b is a schematic diagram of a structure of a TBTT information field in an RNR element according to an embodiment of this application.
Figure 14C:
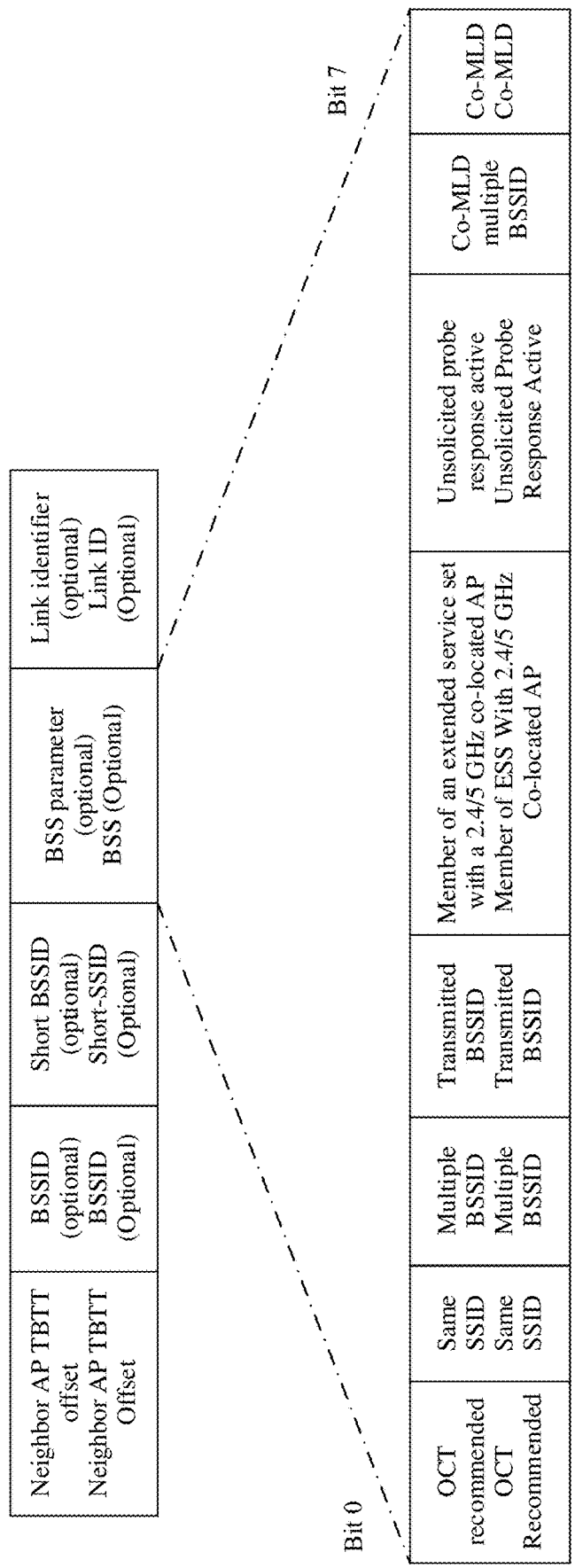
FIG. 14c is a schematic diagram of a structure of another TBTT information field in an RNR element according to an embodiment of this application.

When the TBTT information length is 12 bytes, the TBTT information field includes:
 a neighbor AP TBTT offset (target beacon transmission time offset of a neighbor AP) field indicating an offset between beacon sending time of a neighbor AP and beacon sending time of a reporting AP;
 a BSSID (BSS identifier) field indicating a BSS identifier corresponding to the neighbor AP;
 a short SSID (short service set identifier) field indicating a service set identifier to which the neighbor AP belongs; and
 a BSS parameter field indicating a related parameter of the neighbor AP, as shown in FIG. 14b, the BSS parameter field includes the following information:
 an OCT recommended (on-channel tunneling mechanism recommended) field indicating that the neighbor AP expects to exchange an MPDU of a management type with the reporting AP according to an OCT mechanism;
 a same SSID (same service set identifier) field indicating whether the neighbor AP and the reporting AP have a same SSID;
 a multiple BSSID (multiple basic service set identifier) field indicating whether the neighbor AP is a part of a multiple BSSID set;
 a transmitted BSSID (transmitted basic service set identifier) field indicating, whether the neighbor AP is a transmitted BSSID or a non-transmitted BSSID if the neighbor AP is a part of the multiple BSSID set;
 a member of ESS with 2.4/5 GHz co-located AP (member of extended service set with 2.4/5 GHz co-located AP) field, indicating whether the neighbor AP is a member of an extended service set with 2.4/5 GHz co-located AP (that is, whether the neighbor AP is a 6 GHz only AP); and
 an unsolicited probe response active field indicating whether the neighbor AP enables an active probe response.

Optionally, the TBTT information field further includes: a co-located AP field, indicating whether the neighbor AP and the reporting AP are co-located.

Optionally, the TBTT information field further includes a co-MLD field, indicating whether the neighbor AP and the reporting AP belong to one MLD.

FIG. 14b is a schematic diagram of a format of the TBTT information field. FIG. 14c is another schematic diagram of a format of the TBTT information field.

In this embodiment, to prevent a reporting AP from broadcasting information about one or more or all APs in a multi-AP multi-link device in which the reporting AP is located, an RNR element and a multiple BSSID element are jointly used, and optionally, an MLD element is also used. To avoid repeated parameters such as an operating class, a channel number, and a BSSID of an AP in subsequent multi-link operation, a link identifier of the AP is added to the RNR element and the multiple BSSID element. There is a correspondence between the link identifier of the AP and the parameters such as the operating class, the channel number, and the BSSID of the AP. In subsequent transmission or communication, the parameters such as the operating class, the channel number, and the BSSID of the AP do not need to be carried. This reduces signaling overheads. In addition, because an operating class and a channel number of a non-transmitted BSSID in the multiple BSSID element are the same as an operating class and a channel number of a transmitted BSSID in the multiple BSSID element, the two parameters do not appear in the non-transmitted BSSID profile of the multiple BSSID element. This further reduces signaling redundancy.

The following describes in detail an apparatus provided in embodiments of this application.

Figure 15:
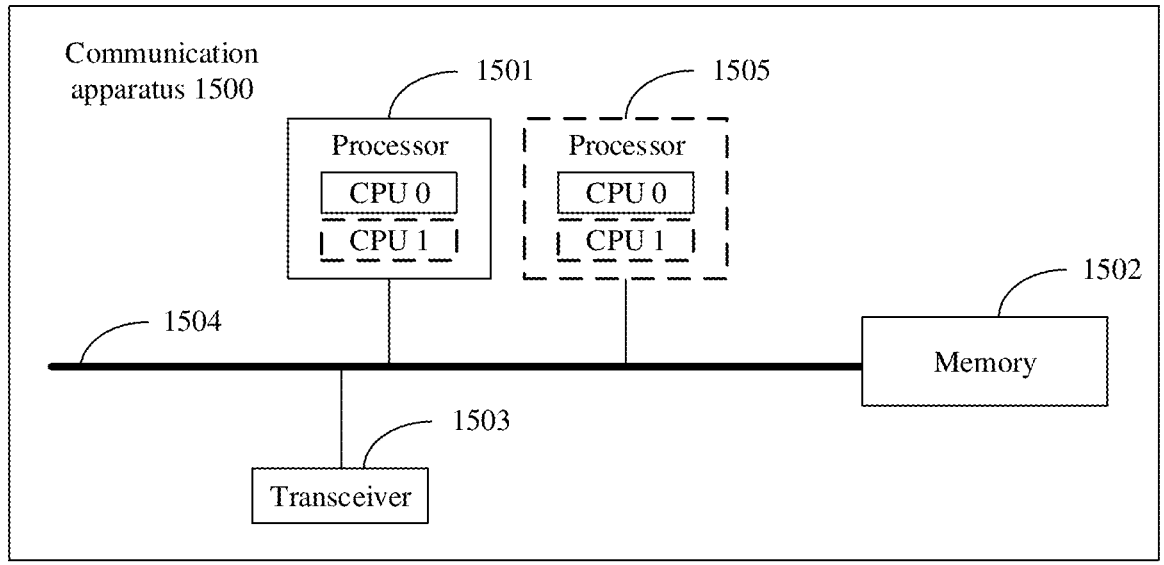
FIG. 15 is a schematic diagram of a composition of a communication apparatus according to an embodiment of this application.

FIG. 15 shows a communication apparatus 1500 according to an embodiment of this application. The apparatus may be the access point AP (for example, the reporting AP in the AP multi-link device) or the station in the foregoing embodiments, or may be a chip or a processing system in the access point AP (for example, the reporting AP in the AP multi-link device) or the station. The apparatus may implement the method and function in any one of the embodiments of this application. Due to a difference between integration degrees, the communication apparatus may include one or more of components shown in FIG. 15. The components shown in FIG. 15 may include at least one processor 1501, a memory 1502, a transceiver 1503, and a communication bus 1504.

The following specifically describes the components of the communication apparatus 1500 with reference to FIG. 15.

The processor 1501 is a control center of the communication apparatus 1500, and may be one processor or may be a collective term of a plurality of processing elements. For example, the processor 1501 may be a central processing unit (CPU), or an application-specific integrated circuit (ASIC), or may be configured as one or more integrated circuits implementing embodiments of this application, for example, one or more microprocessors (DSPs), or one or more field programmable gate arrays (FPGAs). The processor 1501 may implement various functions of the communication device by running or executing a software program stored in the memory 1502 and invoking data stored in the memory 1502. During specific implementation, in an embodiment, the processor 1501 may include one or more CPUs, for example, a CPU 0 and a CPU 1 shown in FIG. 15.

During specific implementation, in an embodiment, the communication apparatus 1500 may include a plurality of processors, for example, the processor 1501 and a processor 1505 shown in FIG. 15. Each of these processors may be a single-core processor (single-CPU) or may be a multi-core processor (multi-CPU). The processor herein may be one or more communication devices, circuits, and/or processing cores configured to process data (for example, computer program instructions).

The memory 1502 may be a read-only memory (ROM) or another type of static storage communication device that can store static information and instructions, or a random access memory (RAM) or another type of dynamic storage communication device that can store information and instructions, or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in an instruction form or a data structure form and that can be accessed by a computer. However, the memory 1502 is not limited thereto. The memory 1502 may independently exist, or may be connected to the processor 1501 through the communication bus 1504. Alternatively, the memory 1502 may be integrated with the processor 1501. The memory 1502 is configured to store a software program for executing the solution of this application, and the processor 1501 controls the execution.

The transceiver 1503 is configured to communicate with another device (for example, the station in the embodiment shown in FIG. 1). Certainly, the transceiver 1503 may be further configured to communicate with a communication network, for example, the Ethernet, a radio access network (RAN), or a wireless local area network (WLAN). The transceiver 1503 may include a receiving unit to implement a receiving function, and a sending unit to implement a sending function.

The communication bus 1504 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

For example, the communication apparatus 1500 is a complete device. The communication apparatus may include the processor 1501, the memory 1502, the transceiver 1503, and the communication bus 1504. Optionally, the communication apparatus may further include another component, for example, a display.

Optionally, the communication apparatus 1500 is an access point AP (for example, a reporting AP in an AP multi-link device), and may be configured to implement the methods and functions related to the AP in the foregoing embodiments. For example, the memory stores a computer program (instructions). When the processor invokes the computer program, the foregoing methods and the functions are implemented. For example, the processor is configured to generate signaling or a frame (carrying MLD information), and the transceiver is configured to send the signaling or the frame (carrying the MLD information). For example, the processor is configured to control the transceiver to perform the step S101. Certainly, a process of generating the MLD information in the step S101 may also be completed by the processor. For another example, the processor is configured to control the transceiver to perform the step S201. Certainly, a process of generating the management frame in the step S201 may also be completed by the processor. For still another example, the processor is configured to control the transceiver to perform the step S301. Certainly, a process of generating the management frame in the step S301 may also be completed by the processor. For still another example, the processor is configured to control the transceiver to perform the step S401. Certainly, a process of generating the management frame in the step S401 may also be completed by the processor.

Optionally, the communication apparatus 1500 is a station, and may be configured to implement the methods and functions of the station in the foregoing embodiments. For example, the memory stores a computer program. When the processor invokes the computer program, the foregoing methods and the functions are implemented. For example, the processor is configured to generate signaling or a frame (for example, a probe response frame), and the transceiver is configured to send the signaling or the frame (for example, receive a probe request frame). In an example, the processor is configured to control the transceiver to receive the MLD information in the step S102, and then the processor determines the structure of the multi-AP multi-link device and the information about each AP based on the MLD information, and may further determine APs for association. In another example, the processor is configured to control the transceiver to receive the management frame in the step S202, and then the processor determines the structure of the multi-AP multi-link device and the information about each AP based on the management frame, and may further determine APs for association. In still another example, the processor is configured to control the transceiver to receive the management frame in the step S302, and then the processor determines the structure of the multi-AP multi-link device and the information about each AP based on the management frame, and may further determine APs for association. In yet another example, the processor is configured to control the transceiver to receive the management frame in the step S402, and then the processor determines the structure of the multi-AP multi-link device and the information about each AP based on the management frame, and may further determine APs for association.

For another example, the communication apparatus 1500 is a chip system or a processing system in an access point AP (for example, a reporting AP in an AP multi-link device), so that a device on which the chip system or the processing system is installed implements the methods and functions related to the AP in the foregoing embodiments. In this case, the communication apparatus 1500 may include some components shown in FIG. 15. For example, the communication apparatus 1500 includes a processor. The processor may be coupled to a memory, invoke instructions in the memory, and execute the instructions, so that a device configured or installed with the chip system or the processing system implements the methods and functions in the foregoing embodiments. Optionally, the memory may be a component in the chip system or the processing system, or may be a coupled/connected component outside the chip system or the processing system. In an example, the chip system or the processing system is installed in the access point AP (for example, the reporting AP in the AP multi-link device), so that the access point AP may perform the step S101 in the foregoing embodiment. In another example, the chip system or the processing system is installed in the access point AP, so that the access point AP may perform the step S201 in the foregoing embodiment. In still another example, the chip system or the processing system is installed in the access point AP, so that the access point AP may perform the step S301 in the foregoing embodiment, for example, the access point indicates the step S401.

For still another example, the communication apparatus 1500 is a chip system or a processing system in the station, so that a device on which the chip system or the processing system is installed implements the method and functions related to the station in the foregoing embodiments. In this case, the communication apparatus 1500 may include some components shown in FIG. 15. For example, the communication apparatus 1500 includes a processor. The processor may be coupled to a memory, invoke instructions in the memory, and execute the instructions, so that a device configured or installed with the chip system or the processing system implements the methods and functions in the foregoing embodiments. Optionally, the memory may be a component in the chip system or the processing system, or may be a coupled/connected component outside the chip system or the processing system. In an example, the chip system or the processing system is installed in the station, so that the station may perform the step S102 in the foregoing embodiment. In another example, the chip system or the processing system is installed in the station, so that the station may perform the step S202 in the foregoing embodiment. In still another example, the chip system or the processing system is installed in the station, so that the station may perform the step S302 in the foregoing embodiment. In yet another example, the chip system or the processing system is installed in the station, so that the station may perform the step S402 in the foregoing embodiment.

The chip system or the processing system may support communication according to 802.11 series protocols, for example, 802.11be, 802.11ax, and 802.11ac. The chip system may be installed in devices in various scenarios that support WLAN transmission. The devices in the WLAN transmission scenarios are described at the beginning of this specification, and details are not described herein.

In embodiments of this application, the access point AP (for example, the reporting AP in the AP multi-link device) or the station may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 16:
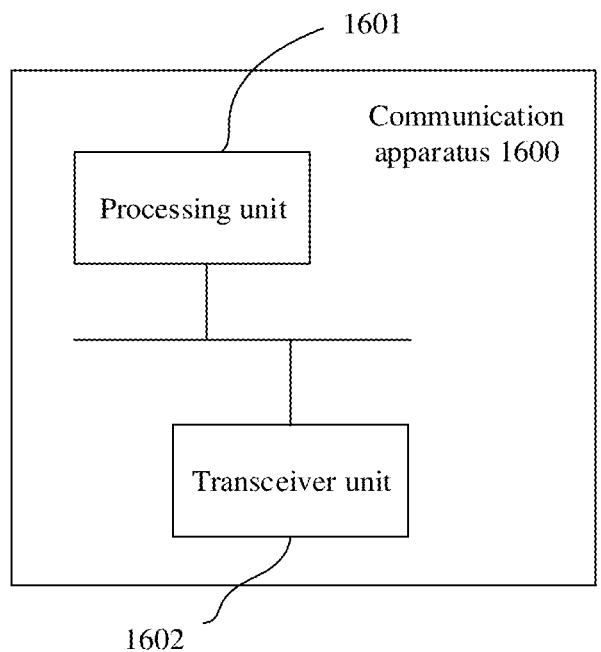
FIG. 16 is a schematic diagram of a composition of another communication apparatus according to an embodiment of this application.

When an integrated unit is used, FIG. 16 is a possible schematic diagram of a structure of a communication apparatus 1600. The communication apparatus 1600 may be a multi-link device, or a chip or a processing system in a multi-link device. The communication apparatus 1600 may perform operations of the multi-link device in the foregoing method embodiments. The communication apparatus 1600 includes a processing unit 1601 and a transceiver unit 1602.

For example, the communication apparatus 1600 is the foregoing access point AP (for example, a reporting AP in an AP multi-link device) or the station.

For example, the communication apparatus 1600 is the access point or a chip in the access point.

The processing unit 1601 may be configured to control and manage actions of the communication apparatus 1600, for example, generate MLD information, for another example, control operations of the transceiver unit 1602. Optionally, if the communication apparatus 1600 includes a storage unit, the processing unit 1601 may further execute a program or instructions stored in the storage unit, so that the communication apparatus 1600 implements the method and functions in any one of the foregoing embodiments.

For example, the processing unit 1601 may control the transceiver unit to perform the step S101 in FIG. 4, S201 in FIG. 10*a*, S301 in FIG. 10*b*, or S401 in FIG. 11, and/or is used for another process of the technology described in this specification. All related content of the steps in the foregoing method embodiments may be cited in function descriptions of the corresponding functional modules. Details are not described herein again.

For example, the processing unit 1601 may control the transceiver unit to perform, for example, the step S102 in FIG. 4, S202 in FIG. 10*a*, S302 in FIG. 10*b*, or S402 in FIG. 11, and/or is used for another process of the technology described in this specification. All related content of the steps in the foregoing method embodiments may be cited in function descriptions of the corresponding functional modules. Details are not described herein again.

For example, the transceiver unit 1602 may send and receive data or signaling transmitted on one link, or may send and receive data or signaling transmitted on a plurality of links. Optionally, the transceiver unit 1602 may be one transceiver module, or may include a plurality of transceiver modules. When the transceiver unit 1602 is one transceiver module, the transceiver module may send and receive data on a plurality of links. For example, if a first multi-link device operates on two links, when the transceiver unit 1602 includes two transceiver modules, one transceiver module operates on one link, and the other transceiver module operates on the other link. For example, the transceiver unit 1602 may be configured to perform, for example, the step S101 in FIG. 4, the step S201 in FIG. 10*a*, the step S301 in FIG. 10*b*, or the step S401 in FIG. 11, and/or is used for another process of the technology described in this specification. All related content of the steps in the foregoing method embodiments may be cited in function descriptions of the corresponding functional modules. Details are not described herein again.

For example, the communication apparatus 1600 may be the communication apparatus shown in FIG. 15, the processing unit 1601 may be the processor 1501 in FIG. 15, and the transceiver unit 1602 may be the transceiver 1503 in FIG. 15. Optionally, the communication apparatus 1600 may further include a memory. The memory is configured to store corresponding program code and data that are for the communication apparatus 1600 to perform any communication method between multi-link devices provided above. Descriptions of all related content of the components in FIG. 15 may be cited in function description of corresponding components of the communication apparatus 1600, and details are not described herein again.

For example, the communication apparatus 1600 may alternatively be a chip or a processor, the processing unit 1603 is a processing circuit in the chip or the processor, the transceiver unit 1602 may be an input/output circuit in the chip or the processor, the input/output circuit is an interface for mutual communication or data exchange between the chip or the processor and another coupled component. It may be ensured that signaling or data information or program instructions are input to the chip or the processor for processing, processed data or signaling is output to the another coupled component, and the first multi-link device on which the chip or the processor is installed is controlled to implement functions.

For another example, the communication apparatus 1600 is the station or a chip in the station.

The processing unit 1601 may be configured to control and manage actions of the communication apparatus 1600, for example, process MLD information, for another example, control operations of the transceiver unit 1602. Optionally, if the communication apparatus 1600 includes a storage unit, the processing unit 1601 may further execute a program or instructions stored in the storage unit, so that the communication apparatus 1600 implements the method and functions in any one of the foregoing embodiments.

For example, the processing unit 1601 may be configured to process the MLD information. For example, the MLD information in the step S102 in FIG. 4 is processed by the processing unit 1601, or the management frame in S202 in FIG. 10*a*, the management frame in S302 in FIG. 10*b*, or the management frame in S402 in FIG. 11 is processed by the processing unit 1601, and/or the processing unit 1601 is used for another process of the technology described in this specification. All related content of the steps in the foregoing method embodiments may be cited in function descriptions of the corresponding functional modules. Details are not described herein again.

For example, the transceiver unit 1602 may send and receive data or signaling transmitted on one link, or may send and receive data or signaling transmitted on a plurality of links. Optionally, the transceiver unit 1602 may be one transceiver module, or may include a plurality of transceiver modules. When the transceiver unit 1602 is one transceiver module, the transceiver module may send and receive data on a plurality of links. For example, if a first station operates on two links, when the transceiver unit 1602 includes two transceiver modules, one transceiver module operates on one link, and the other transceiver module operates on the other link. For example, the transceiver unit 1602 may be configured to perform, for example, the step S102 in FIG. 4, or S202 in FIG. 10*a*, or S302 in FIG. 10*b*, or S402 in FIG. 11, and/or is used for another process of the technology described in this specification. All related content of the steps in the foregoing method embodiments may be cited in function descriptions of the corresponding functional modules. Details are not described herein again.

For example, the communication apparatus 1600 may be the communication apparatus shown in FIG. 15, the processing unit 1601 may be the processor 1501 in FIG. 15, and the transceiver unit 1602 may be the transceiver 1503 in FIG. 15. Optionally, the communication apparatus 1600 may further include a memory. The memory is configured to store corresponding program code and data that are for the communication apparatus 1600 to perform any method provided above. Descriptions of all related content of the components in FIG. 15 may be cited in function description of corresponding components of the communication apparatus 1600, and details are not described herein again.

For example, the communication apparatus 1600 may alternatively be a chip or a processor, the processing unit 1603 is a processing circuit in the chip or the processor, the transceiver unit 1602 may be an input/output circuit in the chip or the processor, the input/output circuit is an interface for mutual communication or data exchange between the chip or the processor and another coupled component. It may be ensured that signaling or data information or program instructions are input to the chip or the processor for processing, processed data or signaling is output to the another coupled component, and a device on which the chip or the processor is installed is controlled to implement functions.

It should be noted that, in the apparatus embodiment part, for the signaling structure of the MLD information and the structure of the management frame, refer to the descriptions in the foregoing embodiments.

An embodiment of this application further provides a computer-readable storage medium. The computer-readable storage medium stores computer program code. When the foregoing processor executes the computer program code, an electronic device (for example, an AP or a station) in which the processor is located is enabled to perform the method in any one of the embodiments.

An embodiment of this application further provides a computer program product. When the computer program product runs on a computer, the computer (for example, an AP or a station) is enabled to perform the method in any one of the embodiments.

An embodiment of this application further provides a communication apparatus. The apparatus may exist in a product form of a chip. A structure of the apparatus includes a processor and an interface circuit. The processor is configured to communicate with another apparatus through a receiving circuit, to enable the apparatus to perform the method in any one of the embodiments.

An embodiment of this application further provides a communication system. The communication system includes the foregoing access point AP (for example, a reporting AP in an AP multi-link device) and a station. The access point AP (for example, the reporting AP in the AP multi-link device) and the station may perform the method (for example, the method in FIG. 4, FIG. 10*a*, FIG. 10*b*, or FIG. 11) in any one of the foregoing embodiments. Method or algorithm steps described in combination with the content disclosed in this application may be implemented by hardware, or may be implemented by a processor by executing software instructions. The software instruction may include a corresponding software module. The software module may be stored in a random access memory (RAM), a flash memory, an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may alternatively be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer-readable storage medium and a communication medium, where the communication medium includes any medium that facilitates transmission of a computer program from one place to another place. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A signaling information exchange method in a wireless local area network (WLAN), comprising:
generating, by a reporting access point (AP), a management frame, wherein the reporting AP is part of a first AP multi-link device (MLD), the management frame comprises MLD information, the MLD information comprises a first MLD element indicating the first AP MLD, a second MLD element indicating another AP MLD different from the first AP MLD, and a multiple basic service set identifier (BSSID) element, the multiple BSSID element comprises information about another AP belonging to the same multiple BSSID set as the reporting AP; and
sending, by the access point, the management frame.

2. The method according to claim 1, wherein the first MLD element comprises a common control field, and
the common control field comprises type information useable to indicate an element type of the first MLD element.

3. The method according to claim 2, wherein the first MLD element is a formal MLD element, and the type information in the first MLD element is useable to indicate that the first MLD element is the formal MLD element.

4. The method according to claim 2, wherein the element type of the first MLD element comprises a formal MLD element and a virtual MLD element, and
the type information in the first MLD element comprises:
a virtual MLD field useable to indicate whether the first MLD element is a virtual MLD element.

5. The method according to claim 4, wherein the virtual MLD field comprises 1 bit; and
in response to the first MLD element being the virtual MLD element, the virtual MLD field is set to a first value, or
in response to the first MLD element being a formal MLD element, the virtual MLD field is set to a second value.

6. The method according to claim 1, wherein the first MLD element comprises a sub-element of the first MLD element that includes information of another AP in the first AP MLD;
in response to a field or element of the another AP being equal to a corresponding field or element of the reporting AP, the field or element of the another AP fails to be included in the sub-element of the first MLD element; or
in response to the field or element of the another AP being different from the field or element of the reporting AP, the field or element of the another AP is included in the sub-element of the first MLD element.

7. The method according to claim 1, wherein the management frame further comprises:
a reduced neighbor report (RNR) element comprising MLD identifiers of a plurality of reported APs, wherein the MLD identifiers of the plurality of reported APs are the same in response to the plurality of reported APs being from the same MLD.

8. A first access point (AP) multi-link device (MLD), comprising:
at least one processor; and
a non-transitory memory coupled to the at least one processor, and configured to store non-transitory instructions, and in response to non-transitory instructions being executed by the at least one processor, cause a reporting AP which is part of the first AP MLD, to:
generate a management frame, wherein the management frame comprises MLD information, the MLD information comprises a first MLD element indicating the first AP MLD, a second MLD element indicating another AP MLD different from the first AP MLD, and a multiple basic service set identifier (BSSID) element, the multiple BSSID element comprises information about another AP belonging to the same multiple BSSID set as the reporting AP; and
send the management frame.

9. The first AP MLD according to claim 8, wherein the first MLD element comprises a common control field, and the common control field comprises type information useable to indicate an element type of the first MLD element.

10. The first AP MLD according to claim 9, wherein the first MLD element is a formal MLD element, and the type information in the first MLD element is useable to indicate that the first MLD element is the formal MLD element.

11. The first AP MLD according to claim 9, wherein the element type of the first MLD element comprises a formal MLD element and a virtual MLD element, and
the type information in the first MLD element comprises:
a virtual MLD field useable to indicate whether the first MLD element is a virtual MLD element.

12. The first AP MLD according to claim 11, wherein the virtual MLD field comprises 1 bit; and
in response to the first MLD element being the virtual MLD element, the virtual MLD field is set to a first value, or
in response to the first MLD element being a formal MLD element, the virtual MLD field is set to a second value.

13. The first AP MLD according to claim 8, wherein
in response to a field or element of the another AP being equal to a corresponding field or element of the AP, the field or element of the another AP fails to be included in the sub-element of the first MLD element; or
in response to the field or element of the another AP being different from the field or element of the AP, the field or element of the another AP is included in the sub-element of the first MLD element.

14. The first AP MLD according to claim 11, wherein the management frame further comprises:
a reduced neighbor report (RNR) element comprising MLD identifiers of a plurality of reported APs, wherein the MLD identifiers of the plurality of reported APs are the same in response to the plurality of reported APs being from the same MLD.

15. A non-transitory computer-readable storage medium, wherein the computer-readable storage medium stores computer instructions, and when the instructions are run on a processor, a reporting AP which is part of a first AP MLD access point (AP) multi-link device (MLD) is caused to:
generate a management frame, wherein the management frame comprises MLD information, the MLD information comprises a first MLD element indicating the first AP MLD, a second MLD element indicating another AP MLD different from the first AP MLD, and a multiple basic service set identifier (BSSID) element, the multiple BSSID element comprises information about another AP belonging to the same multiple BSSID set as the reporting AP; and
send the management frame.

16. The non-transitory computer-readable storage medium according to claim 15, wherein the first MLD element comprises a common control field, and the common control field comprises type information useable to indicate an element type of the first MLD element.

17. The non-transitory computer-readable storage medium according to claim 16, wherein the first MLD element is a formal MLD element, and the type information in the first MLD element is useable to indicate that the first MLD element is the formal MLD element.

18. The non-transitory computer-readable storage medium according to claim 16, wherein the element type of the first MLD element comprises a formal MLD element and a virtual MLD element, and
the type information in the first MLD element comprises:
a virtual MLD field useable to indicate whether the first MLD element is a virtual MLD element.

19. The non-transitory computer-readable storage medium according to claim 18, wherein the virtual MLD field comprises 1 bit; and
in response to the first MLD element being the virtual MLD element, the virtual MLD field is set to a first value, or
in response to the first MLD element being a formal MLD element, the virtual MLD field is set to a second value.

20. The non-transitory computer-readable storage medium according to claim 15, wherein
in response to a field or element of the another AP being equal to a corresponding field or element of the AP, the field or element of the another AP fails to be included in the sub-element of the first MLD element; or
in response to the field or element of the another AP being different from the field or element of the AP, the field or element of the another AP is included in the sub-element of the first MLD element.

* * * * *